EMZYME KINETICS CURVE FOR CRUDE BACILLUS CEREUS ATCC 21768
AMYLASE ASSAYED AT pH 6.9; 25°C; VARIABLE INCUBATION TIMES

EFFECT OF pH ON CRUDE BACILLUS CEREUS ATCC 21768 AMYLASE
ACTIVITY ASSAYED FOR 3 MIN INCUBATION TIME; 25°C; VARIABLE pH

EFFECT OF TEMPERATURE ON CRUDE BACILLUS CEREUS ATCC 21768 AMYLASE STABILITY

EFFECT OF TEMPERATURE ON CRUDE BACILLUS CEREUS ATCC 21768 AMYLASE ACTIVITY ASSAYED AT pH 6.9; 3 MIN. INCUBATION; VARIABLE TEMPERATURES 3,808,102
PROCESS FOR PREPARING ALPHA AMYLASE
John D. Douros, Jr., Littleton, Ira T. Warder, Jr., Lakewood, Grant E. Jansen, Boulder, and Carol M. Richards, Denver, Colo., assignors to The Gates Rubber Company, Denver, Colo.
Filed May 5, 1972, Ser. No. 250,506
Int. Cl. C12d 13/10
U.S. Cl. 195—65                           22 Claims

ABSTRACT OF THE DISCLOSURE

Alpha amylase can be produced by fermenting, under aerobic conditions, nutrient media containing at least a portion of fowl excrement. The fermentation is accomplished by means of microorganisms selected from the group consisting of those Pseudomonas, Corynebacteria, Cellumonas, Bacillus, Aspergillus and Candida capable of producing alpha amylase by metabolizing fowl excrement as a source of assimilable carbon and/or a source of assimilable nitrogen. Particularly good production is obtained by using five newly discovered strains, Bacillus cereus A.T.C.C. No. 21768, Bacillus cereus A.T.C.C. No. 21769, Bacillus cereus A.T.C.C. No. 21770, Bacillus cereus A.T.C.C. No. 21771, Bacillus cereus A.T.C.C. No. 21772. Wheat chaff is an exceptionally useful nutrient ingredient and glycine is a particularly effective stimulant for some of these processes.

BACKGROUND OF THE INVENTION

Figure 1:
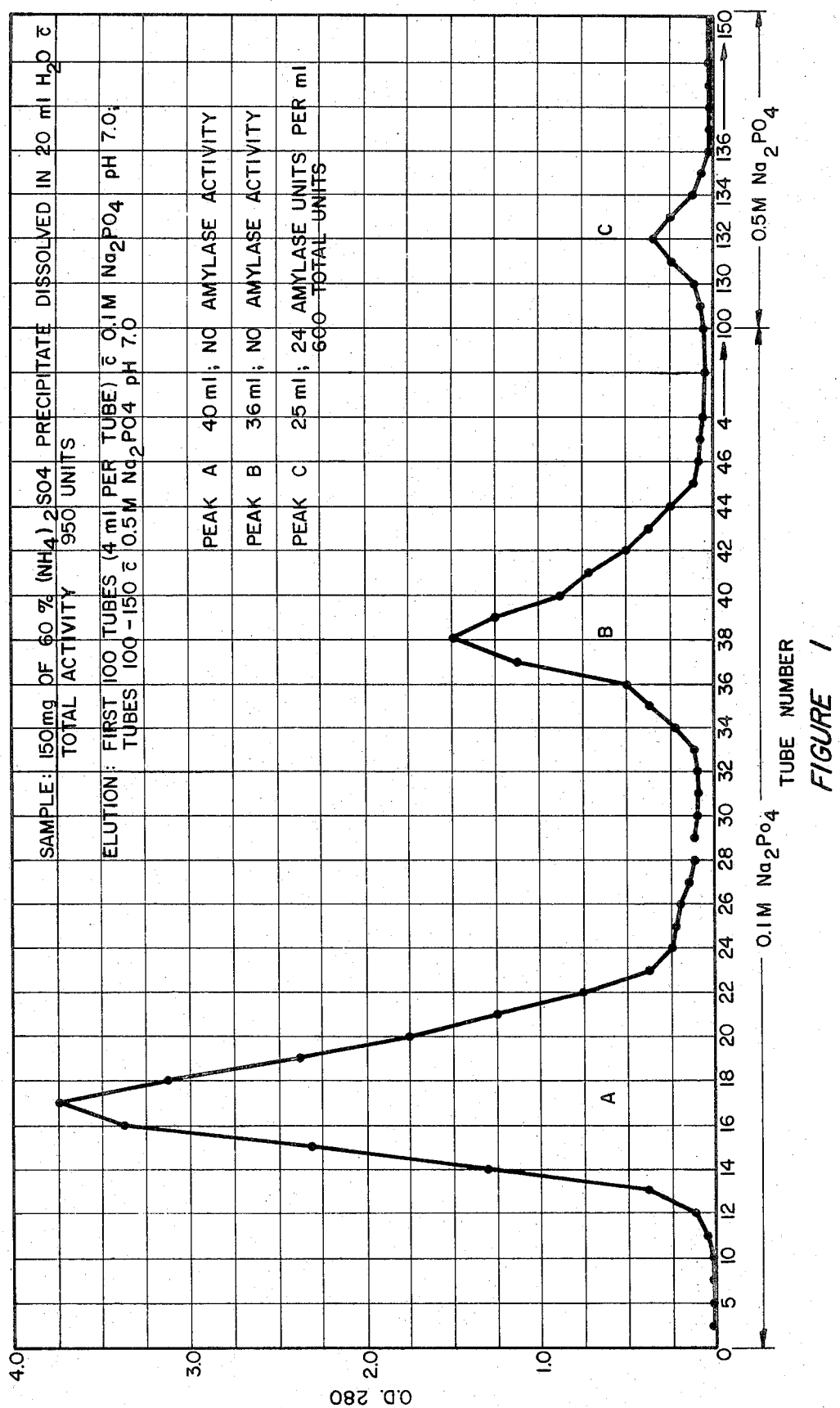
Figure 2:
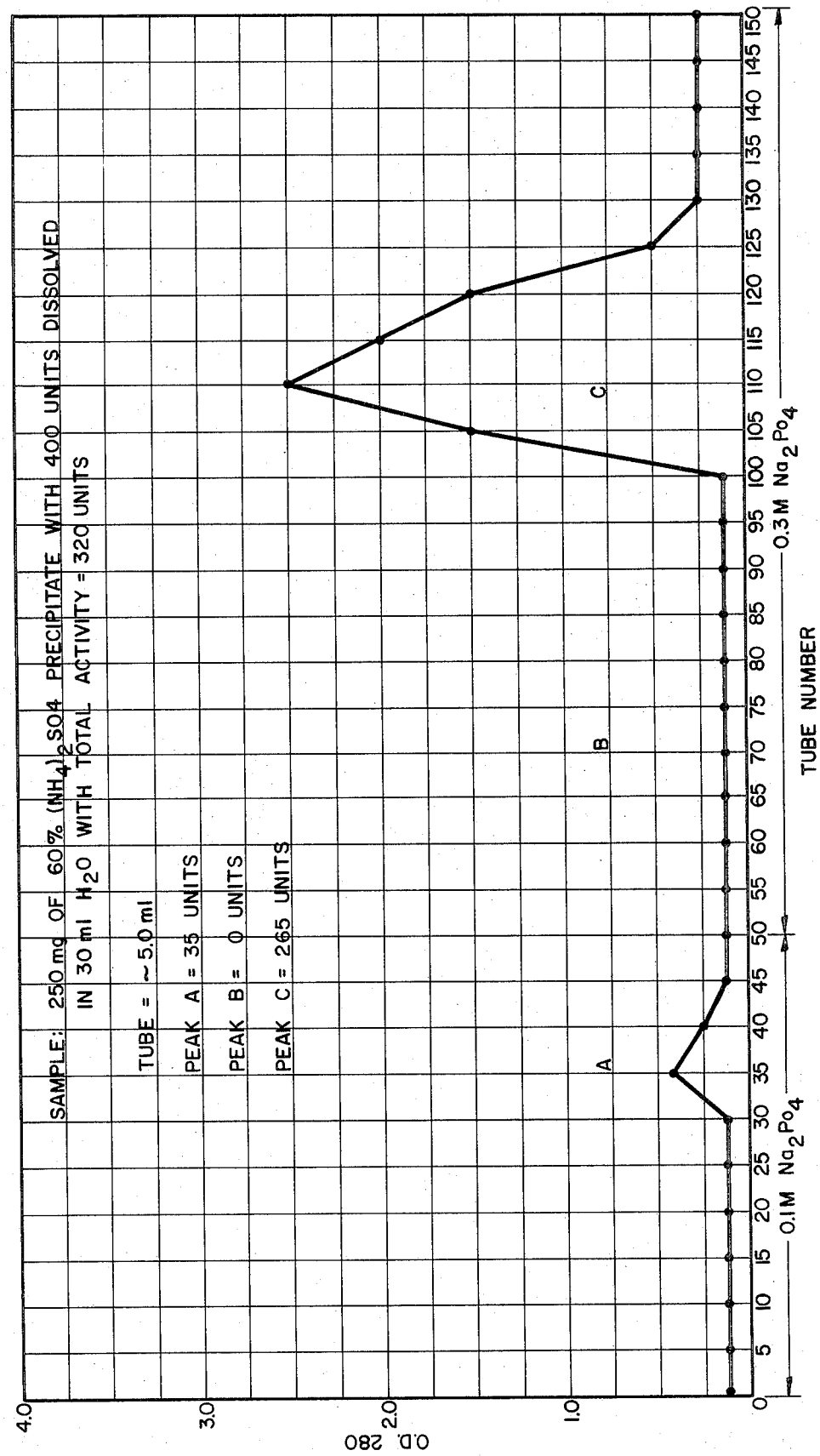
Figure 3:
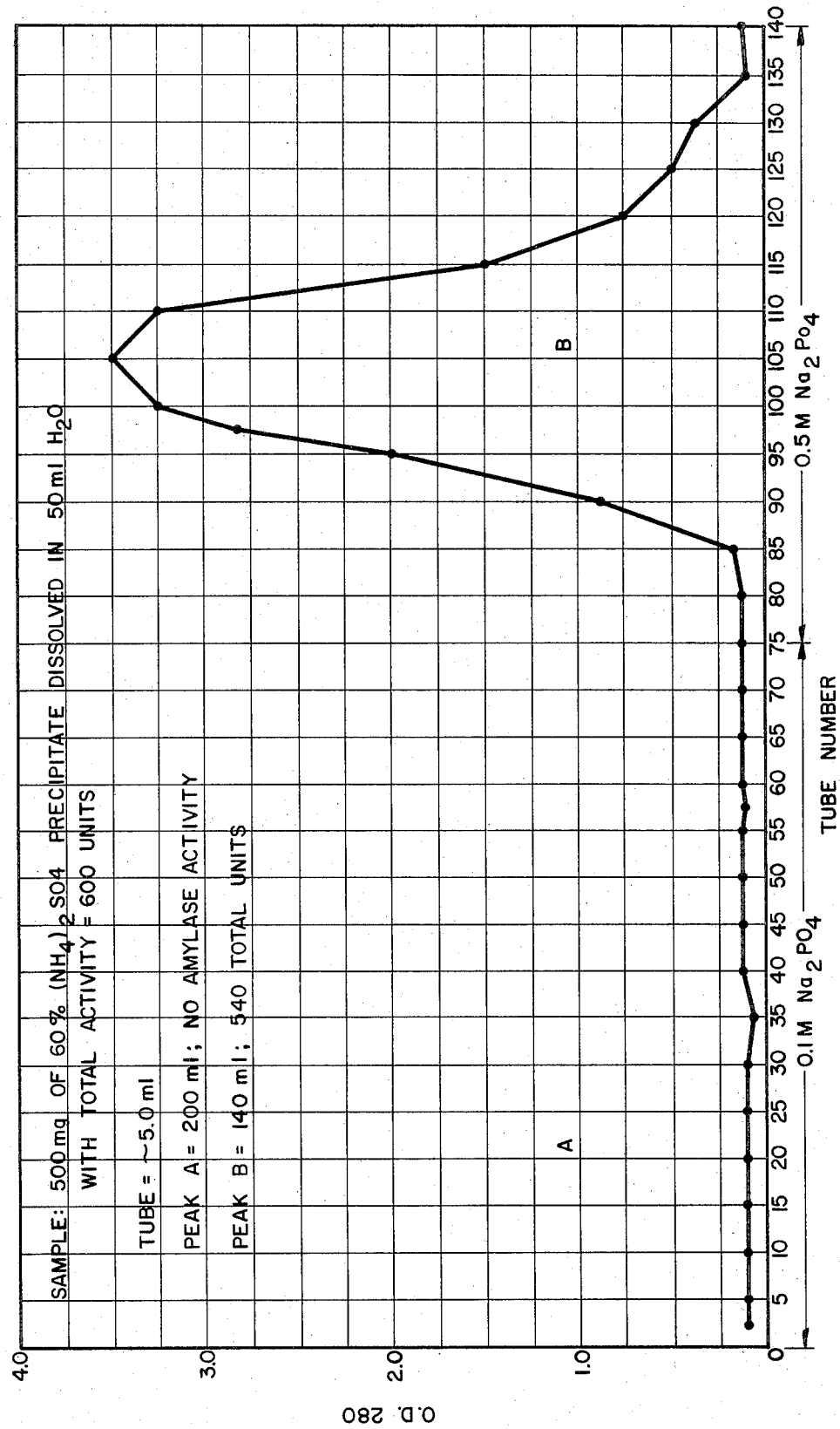
Figure 4:
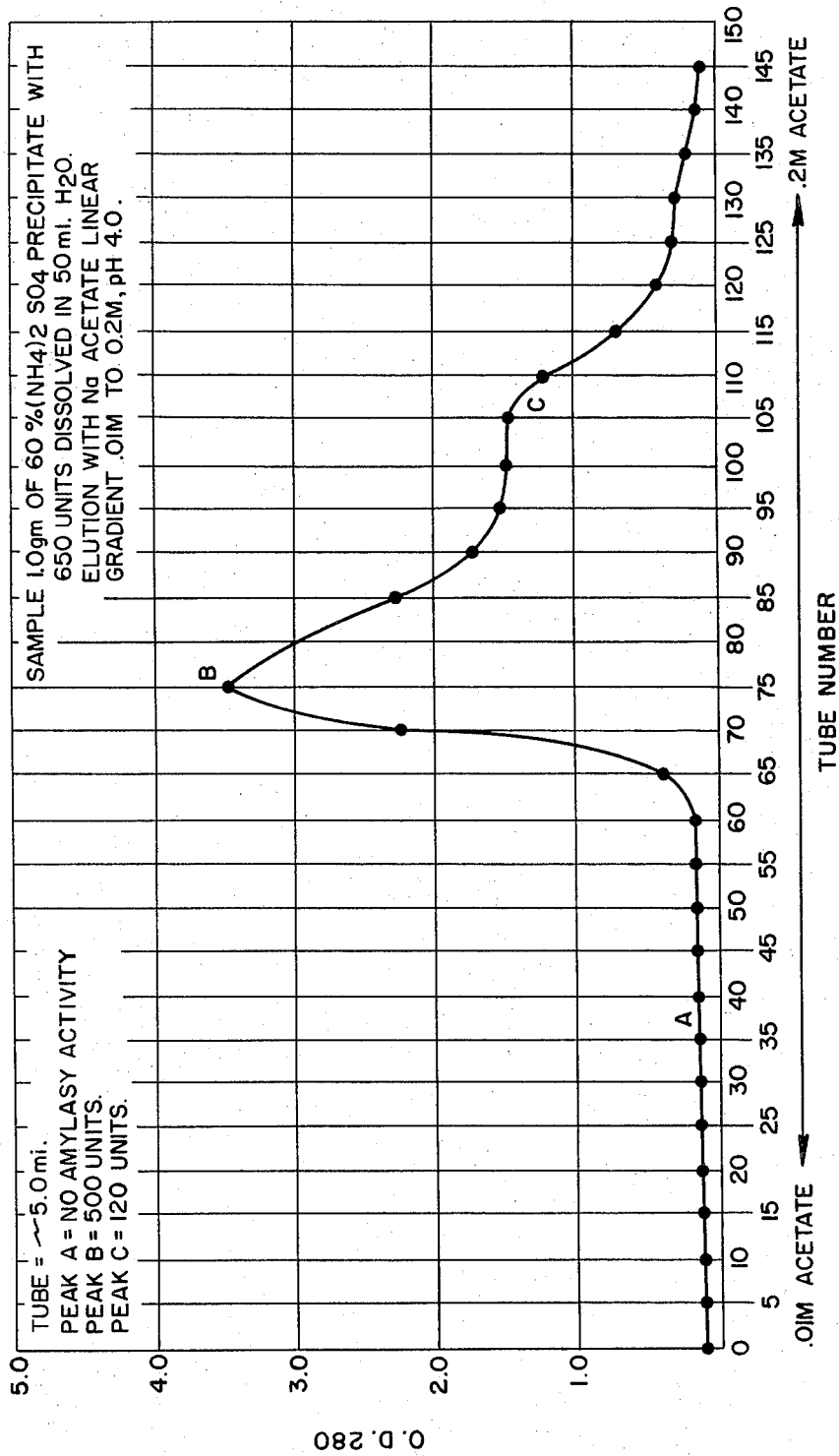
Figure 5:
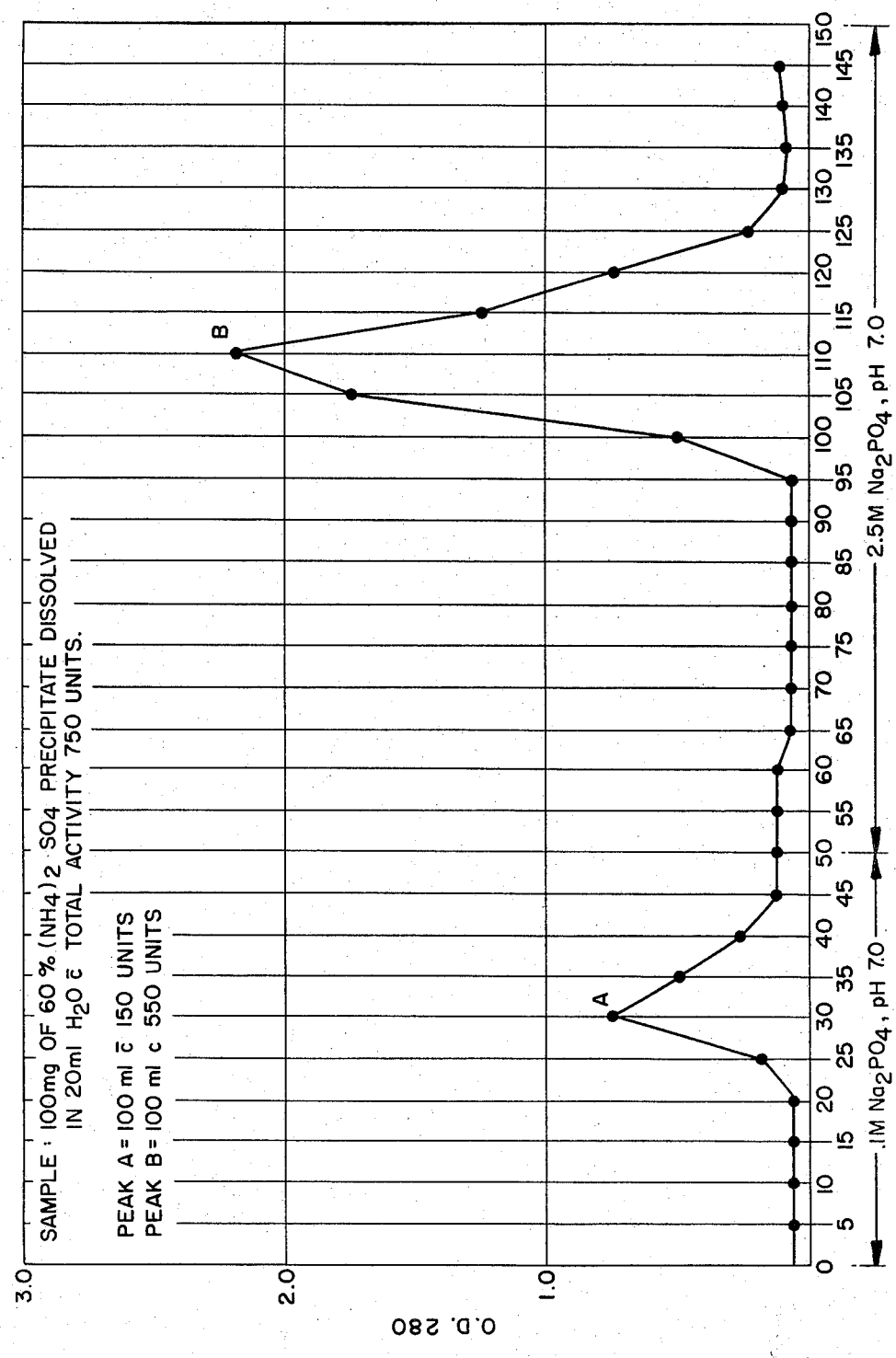

Processes for producing alpha amylase by microorganism fermentation are well known. Typically, nutrient media containing various sources of starch, protein and minor nutrients are formed, sterilized, cooled and inoculated with cultures of various bacteria, yeasts or molds which are capable of producing alpha amylase by metabolizing the nutrient media employed in the particular process. Developments in this art usually involve finding improved nutrient media and growing conditions for particular alpha amplase producing microorganisms. Alpha amylases produced by such processes are noted for their ability to hydrolyze starch to give sugar products such as dextrin, glucose, maltose etc. and are used in numerous commercial, industrial, pharmaceutical and scientific applications. Among these uses may be mentioned, food and beverage preparation, adhesive material manufacture, pollution control, digestive aids, disease treatments and aids in basic research such as that concerned with elucidating the structures of various complex carbohydrates. Representative nutrient media, microorganisms, fermentation processes and uses for alpha amylase are found in United States patents: 2,695,863; 3,012,944; and 3,414,479.

SUMMARY OF THE INVENTION

One aspect of our invention involves using newly discovered Bacillus strains to produce alpha amylase. These strains can be cultured from fowl excrement by methods hereinafter described and have been given the designations: Bacillus cereus A.T.C.C. No. 21768, Bacillus cereus A.T.C.C. No. 21769, Bacillus cereus A.T.C.C. No. 21770, Bacillus cereus A.T.C.C. No. 21771, and Bacillus cereus A.T.C.C. No. 21772.

Another important aspect of this invention is our discovery that alpha amylase production by microorganisms selected from the group consisting of Pseudomonas, Corynebacteria, Aspergillus, Cellumonas, Bacillus, or Candida on nutrient media containing conventional sources of starch, protein and minor nutrients hereinafter described can be greatly enhanced when at least a portion of the nutrient media is fowl excrement. Particularly good alpha amylase production in conventional nutrient media containing a portion of fowl excrement is obtained by using the aforementioned Bacillus strains, Bacillus cereus A.T.C.C. Numbers 21768 through 21772. A complete morphological description of each of these microorganisms will be given in subsequent sections of this application. This invention also describes how alpha amylase can be produced by using fowl excrement as the sole source of assimilable carbon and nitrogen. Still another aspect of this invention is to provide an improved nutrient medium for culturing those microorganisms capable of producing ferment mixtures rich in alpha amylase. To this end the applicants have discovered that wheat chaff provides exceptional nutrient qualities, particularly for the Bacillus cereus No. 21768 strain used in this invention. The applicants have also discovered that glycine stimulates alpha amylase production by the new strains of this invention in a nutrient media which also contains wheat chaff.

The above fermentation processes result in culture fluids which are readily processed by conventional precipitation, filtration and exchange steps to recover alpha amylase. Precipitation usually is accomplished by the addition of a salt of a divalent cation to coagulate the alpha amylase. After precipitation, the alpha amylase produced by the methods of our invention is most conveniently collected by using exchange chromatography of DEAE Cellulose and KCL or other elution solvents.

A more complete understanding of the nature and scope of this invention can be made by referring to the following detailed descriptions, wherein presently preferred illustrative embodiments of the invention are set forth. These descriptions, particularly the examples are given for purposes of illustration and should not be considered as limitations on the scope of this invention.

EXAMPLE 1

Assay method used to establish invention

The preferred standardized technique of alpha amylitic assay used to establish this invention is accomplished according to the general methods of Fischer and Stein (Biochemical Preparation, v.7, 1960) wherein alpha amylase activity is measured by the use of dinitrosalicylic acid (DNS).

The substrate used in this technique is a 1% solution of soluble starch (Noredux Standard, B. Siegfried and Company, Zofingen, Switzerland) dissolved in boiling water and made up with a 0.02 M sodium glycerophosphate-HCl buffered to pH 6.9. The stopping reagent is an alkaline solution of dinitrosalicylic acid prepared by suspending 20 gm. of 3,5-dinitrosalicylic acid in 400 ml. of water. A solution of 32 gm. of NaOH in 800 ml. of water is added dropwise under efficient stirring, and, if necessary, gentle heat in a water bath until a clear solution is obtained. The rest of the NaOH solution is then added and 600 gm. of potassium sodium tartrate is added in small portions. Water is added to a final volume of 2 liters. The solution is then filtered through a large coarse sintered-glass filter and stored at room temperature in the dark.

The actual alpha amylase assays proceed as follows. One ml. of the substrate solution is added to 1 ml. of each of the test alpha amylase solutions diluted in 0.002 M sodium glycerophosphate-HCl buffer at the same pH as the substrate solution. After exactly 3 minutes of incubation at 25° C., 2.0 ml. of the stopping reagent are

| A.T.C.C. number | 21768 | 21769 | 21770 | 21771 | 21772 |
|---|---|---|---|---|---|
| Source | Turkey manure, chicken manure. | Chicken manure, turkey manure. | Chicken manure, turkey manure. | Chicken manure, turkey manure. | Chicken manure, turkey manure. |
| Media | Dextrose starch agar | Dextrose starch agar | Dextrose starch agar | Dextrose starch agar | Dextrose starch agar. |
| Growth temp | 37° C | 37° C | 37° C | 37° C | 37° C. |
| Growth pH | 6.8 | 6.8* | 6.8 | 6.8 | 6.8. |
| Gram strain | Gram +, 3 microns | Gram +, 1½-2μ | Gram +, 1.3μ chains, vaculated. | Gram +, 1½μ | Gram +, 3μ. |
| Spore | Eccentric +, 1.5 μ | Eccentric +, 2μ | Eccentric +, 1.5μ | Eccentric +, .75μ | Eccentric +, 1.5μ |
| Peptone iron | − | − | − | − | − |
| Starch hydrolysis | + | + | + | + | + |
| Litmus milk | − 1 day reduction, (5 days). | − 1 day alkaline (5 days). | − 1 day hydrolysis (5 days). | − 1 day hydrolysis (5 days). | − 1 day hydrolysis (5 days). |
| Colony morphology | White mucoid, glistening. | Grey white mucoid | White mucoid, spreading dark with age. | White mucoid, glistening. | White mucoid, spreading. |
| Indole | − | − | − | − | −. |
| Voges Proskauer | − | − | − | − | −. |
| Nitrate reduction | −No gas | + | + | + | +. |
| Methyl red | − | − | − | − | −. |
| Koser citrate | − | − | − | − | −. |
| Motility | + | + | − | + | +. |
| Catalase | + | + | + | + | +. |
| Gelatin stat | − | + | + | + | +. |

NOTE.—See the following table:

Bacillus cereus A.T.C.C. No. 21768

| Carbohydrate data | Acid | Growth | Gas |
|---|---|---|---|
| Inositol | − | + | − |
| Cellobiose | − | + | + |
| Adonitol | − | + | − |
| Sorbitol | − | + | − |
| Dulcitol | − | + | − |
| Inulin | − | + | + |
| Glycerol | − | − | − |
| Rhamnose | − | Slight | − |
| Salicin | − | − | − |
| Mannitol | − | − | − |
| Maltose | + | + | − |
| Sucrose | + | + | − |
| Dextrose | + | + | − |
| Lactose | − | + | − |

Bacillus cereus A.T.C.C. No. 21769

| | Acid | Growth | Gas |
|---|---|---|---|
| Inositol | − | − | − |
| Cellobiose | + | + | − |
| Adonitol | − | − | − |
| Sorbitol | − | − | − |
| Dulcitol | − | − | − |
| Inulin | − | + | − |
| Glycerol | − | + | − |
| Salicin | − | − | − |
| Mannitol | − | − | − |
| Maltose | + | + | − |
| Sucrose | + | + | + |
| Dextrose | + | + | − |
| Lactose | − | + | − |
| Mannose | + | + | + |

Bacillus cereus A.T.C.C. No. 21770

| | Acid | Growth | Gas |
|---|---|---|---|
| Inositol | − | + | − |
| Cellobiose | + | + | − |
| Adonitol | − | − | − |
| Sorbitol | − | + | − |
| Dulcitol | − | + | − |
| Inulin | − | + | − |
| Glycerol | − | + | − |
| Salicin | − | + | − |
| Mannitol | − | + | − |
| Maltose | + | + | − |
| Sucrose | + | + | − |
| Dextrose | + | + | − |
| Mannose | + | + | − |

Bacillus cereus A.T.C.C. No. 21771

| | Acid | Growth | Gas |
|---|---|---|---|
| Inositol | − | − | − |
| Cellobiose | + | + | − |
| Adonitol | − | − | − |
| Sorbitol | − | − | − |
| Dulcitol | − | − | − |
| Inulin | − | + | − |
| Glycerol | − | − | − |
| Salicin | − | − | − |
| Mannitol | − | + | − |
| Maltose | + | + | − |
| Sucrose | + | + | + |
| Dextrose | + | + | + | added, the tube is placed in boiling water for 5 minutes and then cooled, and the reaction mixture is diluted with 20 ml. of water. The color is read in a Klett-Summerson Photoelectric Colorimeter equipped with a green filter No. 54 (spectral range 500–570 mμ). The extinction value is converted to milligrams of maltose from a stand- and curve established with D (+)—maltose hydrate. No starch or buffer is added to this maltose solution. The applicants have found that the best results are obtained when 1.0±0.5 mg. of maltose are produced during the reaction. This corresponds to the use of 0.3 to 1.0 μgm. of alpha amylase in the assay system. The applicants have defined an alpha amylase activity unit (DNS Unit) as that amount of enzyme that produces 1 mg. of maltose under the above conditions. Unless otherwise specified the results of the tests for alpha amylase found with the following examples are expressed in DNS Units.

EXAMPLE 2

Selection, screening and identification techniques

The isolation, selection and identification of the new strains Bacillus cereus A.T.C.C. Numbers 21768 through 21772 may be accomplished according to known principles. One method used by the applicants is conducted in the following manner. Fusions of chicken excrement sized to 350 mesh or greater are screened for alpha amylase leads on plates prepared with dextrose starch agar using 8 milliliters per plate. After 24, 48 and 72 hour intervals the plates are flooded with an iodine solution composed of 11 grams of iodine and 22 grams of potassium iodide in 500 ml. distilled water. Positive amylase production is indicated by a clear or yellow zone indicating starch degradation. The testing is conducted using basic, neutral and acidic pH adjusted agar but it should be noted that the acid test plates need about a 2% increase in the agar content for proper identification. This procedure is carried out three times in triplicate for reconfirmation of activity (3 positive, 1 positive −1 negative −1 positive, or 3 negative results). Obvious in strain improved colonies are selected and again tested on dextrose starch agar plates with phosphate buffer pHs of 4.5; 6.8; and 8.4. These strains are not inhibited by the high pH of 8.4 or the low of 4.5. The five isolated leads have been deposited with the American Type Culture Collection, Washington, D.C., and have been assigned the designations, Bacillus cereus A.T.C.C. No. 21768, Bacillus cereus A.T.C.C. No 21769, Bacillus cereus A.T.C.C. No. 21770, Bacillus cereus A.T.C.C. No. 21771, Bacillus cereus A.T.C.C. No. 21772.

The cultural and microscopic characteristics of these strains are as follows.

*Bacillus cereus* A.T.C.C. No. 21772

| Carbohydrate data | | Acid | Growth | Gas |
|---|---|---|---|---|
| Inositol | − | + | − | |
| Cellobiose | | + | + | − |
| Adonitol | − | + | − | |
| Sorbitol | + | + | − | |
| Dulcitol | − | + | + | |
| Inulin | | − | + | − |
| Glycerol | + | + | − | |
| Salicin | | − | + | − |
| Mannitol | − | + | − | |
| Maltose | | + | + | − |
| Sucrose | | + | + | − |
| Dextrose | + | + | − | |
| Lactose | − | − | − | |

EXAMPLE 3

Purification of alpha amylase

The general procedure for purification of the alpha amylase produced by each of the five *Bacillus cereus* strains of this invention is summarized below.

| | Step | Activity | Activity/mg. lyophilized material | Purification | Percent recovery |
|---|---|---|---|---|---|
| 1 | 1 liter amylase WBF culture | 30 units per ml. T.A.= 30,000 units. | | 0 | 100 |
| 2 | Dialysis vs. ca. Ac; NaCl 34,000. | 34 units/ml. T.A.= | | 0.13X | 113 |
| 3 | Lyophilized | | 8.3 gm.—4 units/mg. T.A.=33,200. | | 110 |
| 4 | Redissolved, 60% $(NH_4)_2SO_4$ precipitate. | | 2.2 gm.—4 units/mg. T.A.= 30,800. | 3.5X | 102 |
| 5 | Hydroxylapetite, vol.=480 ml. | 45 units/ml., 480 ml.= vol. T.A. 21,600. | | | 72 |
| 6 | Dialysis and lyophilization | | 210 mg.—100 units/mg. T.A.=21,000. | 25X | 70 |

The details of these procedures are as follows. One liter of the supernatant on which each microorganism was grown is assayed for amylase activity and found to have 20–30 units per ml. Each of these solutions is individually dialyzed for two days against 12 liters of 0.01 M calcium acetate, 0.1% sodium chloride buffer, with 4–5 changes of this buffer during the dialysis. The dialyzed solutions are assayed and found to have between 1 and 45 units per ml. Each dialyzed solution is lyophilized and the dry material (about 4 to 8.3 grams) is suspended in 300 ml. of distilled water. Each solution is brought to 60%

$$(NH_4)_2SO_4$$

saturation and the proteins are allowed to precipitate overnight in the cold. Each suspension is centrifuged and the supernatants are found to contain no appreciable amylase activity and are discarded. The pellets are resuspended in 50 ml. of the calcium acetate-sodium chloride buffer. These solutions are found to have amylase activities of 400 to 600 units per ml. and are ready for further purification by column chromatography on hydroxylapetite absorption resin. However, the applicants advise that a small amount of each material (10 ml. with 90 units per ml.) be applied to the column first in order to check the operation of the system. For each test the column is first eluted with 0.1 M sodium phosphate buffer at pH 7.0, which generally gives two U.V. 280 m$\mu$ absorbing peaks which have been designated A and B in the elution profiles which follow. However, these peaks possess little if any amylase activity. Therefore, the columns should be eluted with 0.5 M sodium phosphate buffer at pH 7.0. This procedure results in the elution of a third protein peak C which possess about 400–600 units of the total 950 units of amylase which is initially applied to the column. The elution profile for the protein peaks of each of the new strains is shown in FIGS. 1 through 5.

EXAMPLE 4

Alpha amylase activity of new strains vs. known alpha amylase producing strains Spore isolates of each of the new microorganisms *Bacillus cereus* A.T.C.C. Numbers 21768, 21769, 21770, 21771, and 21772 produced by the techniques of Example 2 are tested for their capacity to produce alpha amylase by comparison with two other known amylase producing microorganisms, *Aspergillus niger*, A.T.C.C. No. 15475, and *Bacillus amyloliquefaciens* A.T.C.C. No. 23843.

A loop of the spores taken from the dextrose starch agar slants of each of the new microorganisms and the two known alpha amylase producing microorganisms are transferred to individual Erlenmeyer flasks which contain 150 ml. of either a Spizzen broth, a Wheat Bran, or a *Bacillus amylase*. About 1 to 5 ml., 16 hour vegetative inoculum is used with the pH adjusted to 6.8. The flasks are then placed in 50° C. water for 15 minutes, then cooled, and the contents are transferred quantitively to a 150 ml. flask. The solution is adjusted to pH 4.8 with 2.0 normal sodium hydroxide solution, transferred to a 500 ml. Erlenmeyer flask, and diluted to about 200 ml. The contents are then transferred to a 250-ml. volumetric flask and diluted to volume. Two hundred ml. are then centrifuged at 2000 r.p.m. for 15 minutes, and the supernatant liquir is decanted into a dry flask. Fifty ml. of this liquor is pipetted into a 70-ml. test tube, 5 ml. of 5.0 normal hydrochloric acid is added, the test tube is stoppered loosely and heated in a boiling water bath for 3 hours and then cooled in an ice bath. The contents of the tube is transferred to a 100 ml. volumetric flask, and adjusted with 2.0 normal sodium hydroxide to a phenolphthalein end point. After dilution to volume, a reducing sugar value, calculated as dextrose, is determined on an aliquot of the final solution. Under these conditions the alpha amylase content of the *Bacillus cereus* A.T.C.C. 21768, 21769, 21770, 21771, and 21772 organisms cultures attained a maximum in about 20 hours while the amylase content of the two known cultures did not attain their maximum growths until about 40 hours. The amylase production of these tests expressed in DNS units are summarized as follows.

| Media | 21768 | 21769 | 21770 | 21771 | 21772 | *Asp. niger* 15475 | *Bacil. amylo.* 23843 |
|---|---|---|---|---|---|---|---|
| Spizzen broth | 2.93. | 2.37 | 8.25 | 3.50 | 2.97 | 2.0 | 2.0 |
| Wheat bran | 3.5 | 9.0 | 35.2 | 4.62 | 9.0 | 3.25 | 2.8 |
| *Bacillus amylase* | 0.7 | 0.7 | 0.7 | 0.7 | 0.7 | 0 | 7.0 |

NOTE. See the following:

Spizzen broth: Boil 200 g. peeled diced potatoes in one liter of tap $H_2O$ for ½ hour. Filter through cotton.[2] Add 5.0 mg. $MnSO_4$. Adjust pH to 6.8. Make-up volume to 1 liter with tap $H_2O$.

Wheat bran filtrate: 100 g. wheat bran (Hamico, Shorts, Red Dog) 300 cc. tap $H_2O$. Autoclave, strain through cheesecloth add 200 ml. tap $H_2O$ and autoclave.

*Bacillus amylase* media:
- 1-leucine=10 mg./l.
- $K_2HPO_4$=14 g.
- Na citrate=.$2H_2O$, 1 g.
- Ammonium sulphate=2 g.
- Magnesium sulph.=$7H_2O$, .2 g.
- 1 liter $H_2O$
- pH to 7
- Autoclave separately—5 g. glucose

EXAMPLE 5

Alpha amylase kinetics

Figure 6:
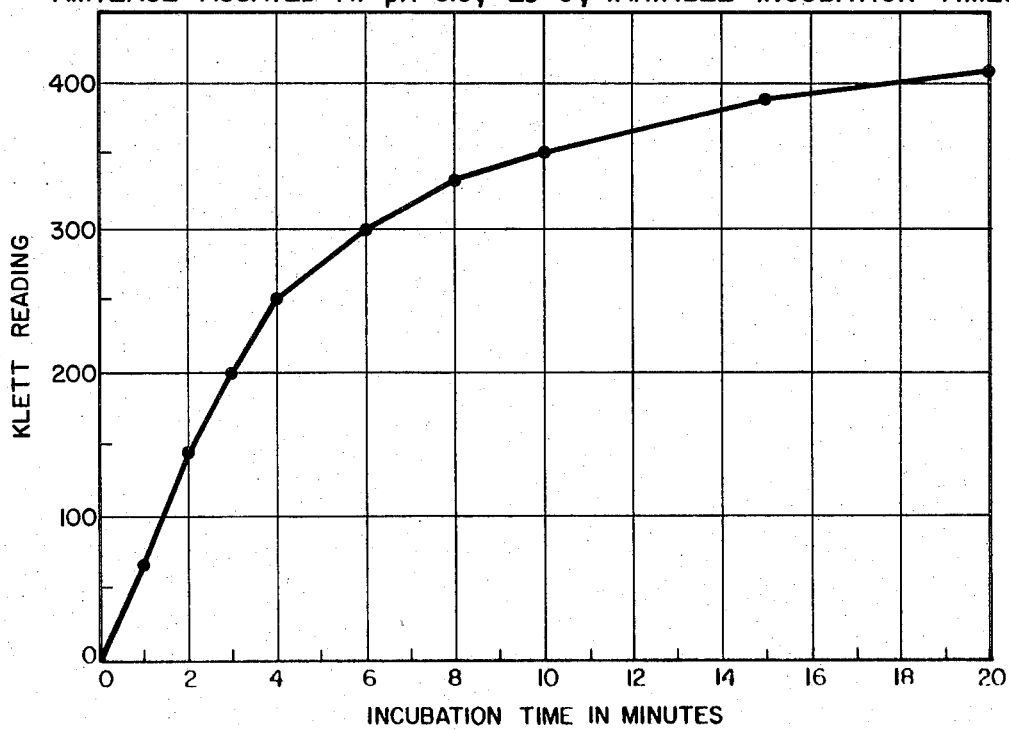

FIG. 6 shows a kinetics curve for the new *Bacillus cereus* A.T.C.C. Number 21768 strain of this invention. The kinetics curves for the other four new *Bacillus cereus* strains of this invention are almost identical with that of the 21768 strain. Therefore, an analysis of the curves show that the reactions of these strains is generally linear to the point where 2.0 amylase units are formed. At this point the reaction rate decreases considerably. Therefore, one must be sure to have the alpha amylase diluted to a concentration which places it on the linear portion of the reaction. Under our assay conditions the activity should be less than 2.0 units per ml.

EXAMPLE 6

Effect of pH on amylase activity

Figure 7:
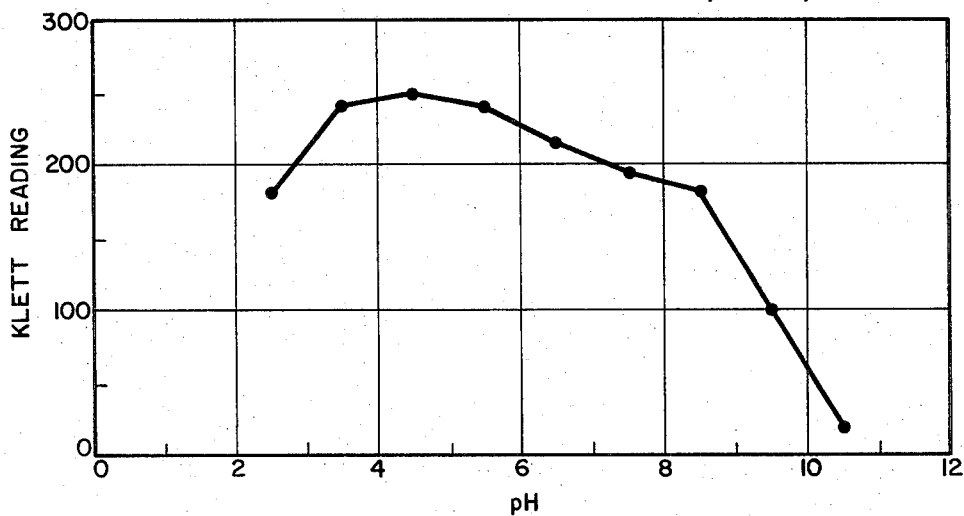

Each enzyme is assayed at 25° C. for three minutes but at various pH's. Both the enzyme solution and the 1% starch solutions are prepared in a buffer solution at the pH in which the alpha amylase is going to be assayed. The results for *Bacillus cereus* A.T.C.C. No. 21768 are shown on FIG. 7. Again the curves for the other four strains are almost identical. Examination of the pH curves show maximal activity at about pH 7.5. Generally there is still about 30–40% of the maximal activity present at a pH of 10.5.

EXAMPLE 7

Effect of prolonged heat treatment on stability of amylase activity

Figure 8:
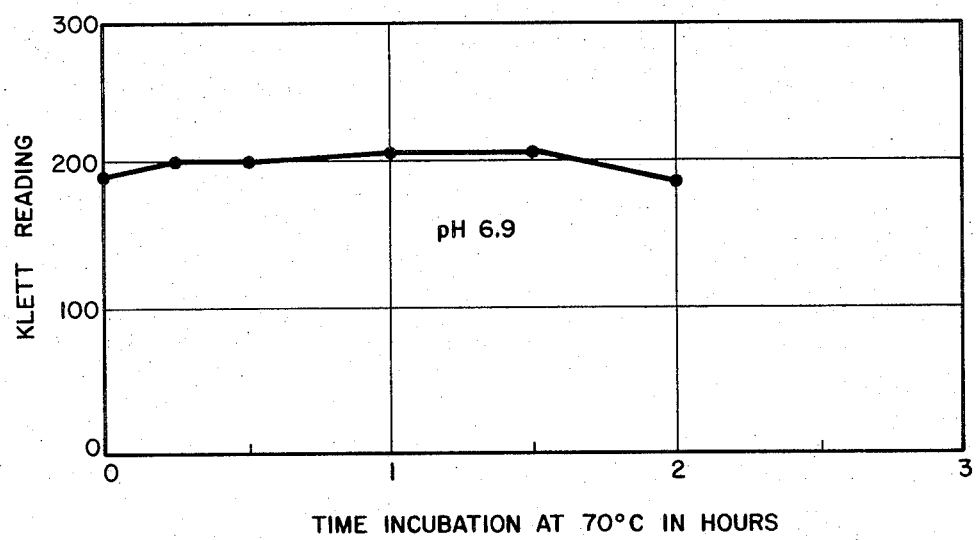

Each amylase solution is subjected to 70° C. for zero time, 1 hour, 2 hours, 3 hours etc. The alpha amylase samples are then cooled and assayed at 25° C. The results of these tests for each strain are very similar and are shown in FIG. 8. There is no loss of activity after 1 hour at 70° C. After 2 hours there is about a 20% loss of alpha amylase activity and after 3 hours incubation there is about a 30% loss in enzyme activity.

EXAMPLE 8

Effect of temperature on activity

Figure 9:
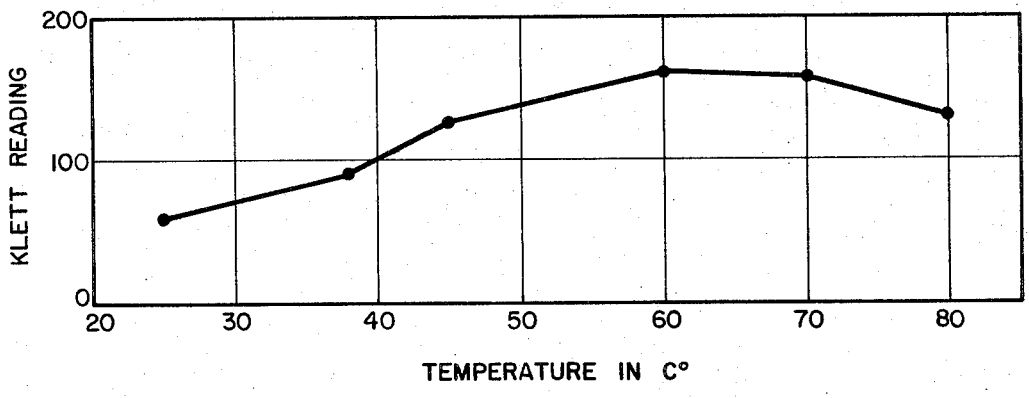

The alpha amylase produced by each of the five new strains of this invention are assayed as above but at various temperatures. The alpha amylase solutions and starch substrate solutions are pre-warmed for five minutes at the assay temperature before the reaction was started. The results of these tests are almost identical and are shown on the graph in FIG. 9. Examination of these temperature curves shows that there is an almost linear increase in amylase activity from 25 to 45° C. Generally from 45 to 70° C. there is only a slight increase in amylase activity, and at 80° C. there is generally a 10–30% decrease in alpha amylase activity.

EXAMPLE 9

Additional experiments are carried out wherein the alpha amylase activity of the enzymes produced by the new strains of this invention is compared to a known commercial (Novo) alpha amylase producing enzyme.

TABLE 1.—COMPARISON OF NOVO AMYLASE AND AMYLASE PRODUCED BY *Bacillus Cereus* A.T.C.C. NUMBER 21768

|  | Novo amylase | Crude 21768 | Purified 21768 |
|---|---|---|---|
| Specific activity: DNS units per milligram enzyme | 20 | 14 | 100 |
| Optimum pH | 5.5 | 4.5 | 5.5 |
| Percent optimum activity at— |  |  |  |
| pH 2.5 | 0 | 70 | 42 |
| pH 8.5 | 51 | 72 | 49 |
| pH 9.5 | 5 | 40 | 36 |
| pH 10.5 | 2.5 | 9 | 5 |
| Effect of temperature on activity: |  |  |  |
| 1. Optimum temperature, °C | 45 | 60 | 60 |
| 2. Percent increase of activity at optimum over activity at 25° C | 43 | 160 | 116 |
| 3. Percent optimum activity at 80° C | 60 | 78 | 58 |
| Effect of temperature on stability: |  |  |  |
| 1. Percent activity loss after 15 min. at 70° C | 7 | 0 | 0 |
| 2. Percent activity loss after 30 min. at 70° C | 80 | 0 | 78 |
| 3. Percent activity loss after 1 hr. at 70° C | 94 | 0 | 95 |
| 4. Percent activity loss after 2 hrs. at 70° C |  | 2.6 |  |
| Effect of high temperature and high pH on amylase stability: | (¹) |  | (²) |
| 1. Percent loss after 15 min. at pH 8.5 |  | 0 |  |
| 2. Percent loss after 30 min. at pH 8.5 |  | 0 |  |
| 3. Percent loss after 15 min. pH 9.5 |  | 16 |  |
| 4. Percent loss after 30 min. pH 9.5 |  | 27 |  |
| 5. Percent loss after 15 min. pH 10.5 |  | 33 |  |
| 6. Percent loss after 30 min. pH 10.5 |  | 60 |  |

¹ Since the enzyme was very unstable at high temp. (70° C.), the combined effect of high temperature and high pH was not performed.
² Not performed for same reason as stated for novo amylase.

TABLE 2.—COMPARISON OF NOVO AMYLASE AND AMYLASE PRODUCED BY *Bacillus cereus* A.T.C.C. NUMBER 21769

|  | Novo amylase | Crude 21769 | Purified 21769 |
|---|---|---|---|
| Specific activity: DNS units per milligram enzyme | 20 | 5 | 50 |
| Optimum pH | 5.5 | 5.0 | 5.5 |
| Percent optimum activity at— |  |  |  |
| pH 2.5 | 0 | 45 | 33 |
| pH 8.5 | 51 | 60 | 55 |
| pH 9.5 | 5 | 33 | 24 |
| pH 10.5 | 2.5 | 8 | 0 |
| Effect of temperature on activity: |  |  |  |
| 1. Optimum temperature, °C | 45 | 60 | 60 |
| 2. Percent increase of activity at optimum over activity at 25° C | 43 | 150 | 135 |
| 3. Percent optimum activity at 80° C | 60 | 70 | 52 |
| Effect of temperature on stability: |  |  |  |
| 1. Percent activity loss after 15 min. at 70° C | 7 | 10 | 8 |
| 2. Percent activity loss after 30 min. at 70° C | 80 | 22 | 40 |
| 3. Percent activity loss after 1 hr. at 70° C | 94 | 36 | 70 |
| 4. Percent activity loss after 2 hrs. at 70° C |  | 70 | 95 |
| Effect of high temperature and high pH on amylase stability: | (¹) | (²) | (²) |
| 1. Percent loss after 15 min. at pH 8.5 |  | 0 |  |
| 2. Percent loss after 30 min. at pH 8.5 |  | 5 |  |
| 3. Percent loss after 15 min. pH 9.5 |  | 20 |  |
| 4. Percent loss after 30 min. pH 9.5 |  | 42 |  |
| 5. Percent loss after 15 min. pH 10.5 |  | 40 |  |
| 6. Percent loss after 30 min. pH 10.5 |  | 60 |  |

¹ Since the enzyme was very unstable at high temp. (70° C.), the combined effect of high temperature and high pH was not performed.
² Not performed for same reason as stated for novo amylase.

TABLE 3.—COMPARISON OF NOVO AMYLASE AND AMYLASE PRODUCED BY *Bacillus cereus* A.T.C.C. NUMBER 21770

|  | Novo amylase | Crude 21770 | Purified 21770 |
|---|---|---|---|
| Specific activity: DNS units per milligram enzyme | 20 | 10 | 72 |
| Optimum pH | 5.5 | 4.5 | 4.5 |
| Percent optimum activity at— |  |  |  |
| pH 2.5 | 0 | 40 | 26 |
| pH 8.5 | 51 | 45 | 30 |
| pH 9.5 | 5 | 35 | 20 |
| pH 10.5 | 2.5 | 10 | 5 |
| Effect of temperature on activity: |  |  |  |
| 1. Optimum temperature, °C | 45 | 50 | 50 |
| 2. Percent increase of activity at optimum over activity at 25°C | 43 | 85 | 90 |
| 3. Percent optimum activity at 80°C | 60 | 70 | 72 |
| Effect of temperature on stability: |  |  |  |
| 1. Percent activity loss after 15 min. at 70°C | 7 | 0 | 0 |
| 2. Percent activity loss after 30 min. at 70°C | 80 | 0 | 75 |
| 3. Percent activity loss after 1 hr. at 70°C | 94 | 5 | 95 |
| 4. Percent activity loss after 2 hrs. at 70°C |  | 10 |  |
| Effect of high temperature and high pH on amylase stability | (¹) | (²) | (²) |
| 1. Percent loss after 15 min. at pH 8.5 |  | 0 |  |
| 2. Percent loss after 30 min. pH 8.5 |  | 0 |  |
| 3. Percent loss after 15 min. pH 9.5 |  | 10 |  |
| 4. Percent loss after 30 min. pH 9.5 |  | 15 |  |
| 5. Percent loss after 15 min. pH 10.5 |  | 32 |  |
| 6. Percent loss after 30 min. pH 10.5 |  | 48 |  |

¹ Since the enzyme was very unstable at high temp. (70° C.), the combined effect of high temperature and high pH was not performed.
² Not performed for same reason as stated for novo amylase.

TABLE 4.—COMPARISON OF NOVO AMYLASE AND AMYLASE PRODUCED BY *Bacillus cereus* A.T.C.C. NUMBER 21771

|  | Novo amylase | Crude 21771 | Purified 21771 |
|---|---|---|---|
| Specific activity: DNS units per milligram enzyme | 20 | 20 | 85 |
| Optimum pH | 5.5 | 5.5 | 5.5 |
| Percent optimum activity at— |  |  |  |
| pH 2.5 | 0 | 52 | 42 |
| pH 8.5 | 51 | 48 | 33 |
| pH 9.5 | 5 | 30 | 20 |
| pH 10.5 | 2.5 | 15 |  |
| Effect of temperature on activity: |  |  |  |
| 1. Optimum temperature, °C | 45 | 55 | 60 |
| 2. Percent increase of activity at optimum over activity at 25°C | 43 | 90 | 90 |
| 3. Percent optimum activity at 80°C | 60 | 70 | 68 |
| Effect of temperature on stability: |  |  |  |
| 1. Percent activity loss after 15 min. at 70°C | 7 | 0 | 5 |
| 2. Percent activity loss after 30 min. at 70°C | 80 | 10 | 82 |
| 3. Percent activity loss after 1 hr. at 70°C | 94 | 25 | 98 |
| 4. Percent activity loss after 2 hrs. at 70°C |  | 39 |  |
| Effect of high temperature and high pH on amylase stability | (¹) | (²) | (²) |
| 1. Percent loss after 15 min. at pH 8.5 |  | 5 |  |
| 2. Percent loss after 30 min. at pH 8.5 |  | 20 |  |
| 3. Percent loss after 15 min. pH 9.5 |  | 25 |  |
| 4. Percent loss after 30 min. pH 9.5 |  | 48 |  |
| 5. Percent loss after 15 min. pH 10.5 |  | 35 |  |
| 6. Percent loss after 30 min. pH 10.5 |  | 60 |  |

¹ Since the enzyme was very unstable at high temp. (70° C.), the combined effect of high temperature and high pH was not performed.
² Not performed for same reason as stated for novo amylase.

TABLE 5.—COMPARISON OF NOVO AMYLASE AND AMYLASE PRODUCED BY *Bacillus cereus* A.T.C.C. Number 21772

|  | Novo amylase | Crude 21772 | Purified 21772 |
|---|---|---|---|
| Specific activity: DNS units per milligram enzyme | 20 | 12 | 120 |
| Optimum pH | 5.5 | 4.5 | 4.5 |
| Percent optimum activity at— |  |  |  |
| pH 2.5 | 0 | 75 | 70 |
| pH 8.5 | 51 | 60 | 48 |
| pH 9.5 | 5 | 42 | 30 |
| pH 10.5 | 2.5 | 12 | 0 |
| Effect of temperature on activity: |  |  |  |
| 1. Optimum temperature, °C | 45 | 60 | 60 |
| 2. Percent increase of activity at optimum over activity at 25°C | 43 | 120 | 100 |
| 3. Percent optimum activity at 80°C | 60 | 69 | 62 |
| Effect of temperature on stability: |  |  |  |
| 1. Percent activity loss after 15 min. at 70°C | 7 | 5 | 8 |
| 2. Percent activity loss after 30 min. at 70°C | 80 | 8 | 16 |
| 3. Percent activity loss after 1 hr. at 70°C | 94 | 22 |  |
| 4. Percent activity loss after 2 hrs. at 70°C |  | 30 | 88 (²) |
| Effect of high temperature and high pH on amylase stability | (¹) | (²) | 40 |
| 1. Percent loss after 15 min. at pH 8.5 |  | 10 |  |
| 2. Percent loss after 30 min. pH 8.5 |  | 25 |  |
| 3. Percent loss after 15 min. pH 9.5 |  | 22 |  |
| 4. Percent loss after 30 min. pH 9.5 |  | 36 |  |
| 5. Percent loss after 15 min. pH 10.5 |  | 28 |  |
| 6. Percent loss after 30 min. pH 10.5 |  | 62 |  |

¹ Since the enzyme was very unstable at high temp. (70° C.), the combined effect of high temperature and high pH was not performed.
² Not performed for same reason as stated for novo amylase.

EXAMPLE 10

To illustrate the ability of the five microorganisms to produce alpha amylase in other media, a culture medium was prepared to the following composition:

|  | Percent |
|---|---|
| Carbon source (see Table 6) | 2–10 |
| N from urea | 1 |
| $CaCO_3$ | 2 |
| $CaCl_2$ | 0.1 |
| $MgCl_2$ | 0.1 |
| $FeCl_2$ | 0.01 |
| $KH_2PO_4$ | 1 |

Water, 1000 ml.

100 milliliter batches of the above-mentioned medium were placed in a 500 ml. baffled shaking flask and sterilized by steam in the flasks at 121° C. for 15 minutes. *Bacillus cereus* A.T.C.C. No. 21768 through 21772 were independently inoculated into these fermentation media and cultivated under aerobic conditions at 37° C. for 48 hours at 250 to 900 rev./min. impeller speed which imparts about 40 to 60 liters/min. air. The pH of the system varies from 6.0 to 9.0.

The microbial paste of the cells is stored at −20° C. The paste is then ruptured using a bacterial homogenizer at a temperature of 5° C. and .01 ml. tris buffer, 10 liters EDTA (3 g.) and mercaptoethanol (8 ml.) are added. The protein containing supernatant is then fractionated with various polyethylene glycol concentrations of 50, 5, 10, 15, 20 percent. Each fractionation is allowed to stand at least 1 hour before centrifugation. The amount of alpha amylase accumulated in each cultured broth was as shown in Table 6.

TABLE 6

| Carbon source | Conc., percent | 21768 | 21770 | 21771 | 21772 |
|---|---|---|---|---|---|
| Wheat chaff | 2 | 73 | 40 | 60 | 39 |
| Wheat bean | 2 | 62 | 42 | 60 | 44 |
| Cracked cereal grain | 2 | 51 | 40 | 37 | 39 |
| Corn meal | 2 | 40 | 30 | 37 | 38 |
| Oatmeal | 2 | 25 | 10 | 9 | 11 |
| Rye meal | 2 | 18 | 23 | 8 | 19 |
| Cracked rice | 2 | 15 | 31 | 5 | 23 |
| Corn steep liquor | 2 | 60 |  | 27 | 29 |
| Starch (potato) | 2 | 39 | 11 | 10 | 3 |
| Wheat bran | 2 | 59 | 28 | 19 | 19 |
| Soy bean oil | 2 | 18 | 31 | 26 | 26 |
| Soy bean meal | 2 | 18 | 15 | 10 | 11 |
| Zein | 2 | 19 | 15 | 10 | 11 |
| Cotton seed meal | 2 | 40 | 10 | 50 | 41 |
| Casein | 2 | 16 | 31 | 8 | 19 |
| Wheat chaff | 4 | 192 | 93 | 40 | 44 |
| Wheat bran | 4 | 65 | 90 | 43 | 50 |
| Cracked cereal grain | 4 | 64 | 113 | 33 | 39 |
| Corn meal | 4 | 32 | 20 | 31 | 40 |
| Oatmeal | 4 | 26 | 28 | 11 | 16 |
| Rye meal | 4 | 6 | 29 | 9 | 26 |
| Cracked rice | 4 | 11 | 30 | 11 | 23 |
| Corn steep liquor | 4 | 24 | 43 | 20 | 21 |
| Starch (potato) | 4 | 44 | 39 | 19 | 30 |
| Wheat bran | 4 | 23 | 44 | 11 | 16 |
| Soy bean oil | 4 | 11 | 26 | 11 | 16 |
| Zein | 4 | 14 | 11 | 14 | 50 |
| Cotton seed meal | 4 | 41 | 39 | 50 | 23 |
| Casein | 4 | 17 | 15 | 11 | 23 |
| Wheat chaff | 6 | 190 | 88 | 43 | 60 |
| Wheat bran | 6 | 73 | 86 | 43 | 61 |
| Cracked cereal grain | 6 | 50 | 100 | 38 | 54 |
| Corn meal | 6 | 30 | 23 | 31 | 30 |
| Oatmeal | 6 | 30 | 30 | 12 | 19 |
| Rye meal | 6 | 18 | 34 | 12 | 11 |
| Cracked rice | 6 |  | 37 | 11 | 19 |
| Corn steep liquor | 6 |  | 36 | 29 | 21 |
| Starch (potato) | 6 | 24 | 40 | 19 | 29 |
| Wheat bran | 6 | 73 | 33 | 11 | 30 |
| Soy bean oil | 6 |  | 26 |  | 10 |
| Soy bean meal | 6 |  |  |  | 11 |
| Wheat chaff | 10 | 40 | 85 | 5 | 30 |
| Wheat bran | 10 | 40 | 80 | 3 | 33 |
| Cracked cereal grain | 10 | 40 | 100 | 3 | 18 |
| Corn meal | 10 | 15 | 10 | 1 | 21 |

The following examples further illustrate the teachings of this invention with respect to variations in nutrient media and fermentation conditions.

EXAMPLE 11

About 500 ml. chicken waste culture medium were prepared with the following composition:

|  | Percent |
|---|---|
| Chicken waste hulls, 80 mesh | 5 |
| $(NH_4)_2HPO_4$ | 0.5 |
| $CaCO_3$ | 2.0 |
| $K_2HPO_4$ | 0.1 |
| $CaCl_2$ | 1 |
| $MgCl_2$ | 0.01 |

The medium was sterilized, inoculated with *Bacillus cereus* A.T.C.C. 21770 and cultivated with shaking at 37° C. for 60 hours. The culture broth so obtained was transferred (10% by volume) to a main culture medium of the composition given above to which was cultivated with shaking at 37° C. A 50% urea solution was added during fermentation as needed to maintain the pH between 6 and 8, and chicken waste was supplied two times at a rate of 2% to make up for consumption. After 60 hours of fermentation, the concentration of alpha amylase in the culture medium amounted to 45 DNS units. This same experiment is repeated using Corn steep liquor rather than chicken waste and only 26–31 DNS units are produced.

EXAMPLE 12

About 500 ml. of chicken waste culture medium were sterilized in a 500 ml. Erlenmeyer baffled flask, the medium having the following composition:

|  | Percent |
|---|---|
| Chicken waste hulls, 80 mesh | 3 |
| Urea | 0.1 |
| $K_2HPO_4$ | 0.5 |
| $CaCl_2$ | 0.5 |
| $MgCl_2$ | 0.05 |
| $FeCl_2$ | 0.05 |

*Bacillus cereus* A.T.C.C. 21768 was inoculated into the medium and cultivated at 30° C. for 18 hours, with shaking. During the fermentation, the pH was kept at 6 to 9 with a 50% urea solution. At the end of the cultivation period, alpha amylase accumulated in the culture broth amounted to 1,000 units/ml. or about 3.5 with the dinitrosalicylic acid test. Identical tests using Corn steep liquor rather than chicken waste produced 1.0 DNS units.

EXAMPLE 13

A culture broth of *Bacillus cereus* A.T.C.C. 21772 was cultivated in a culture medium composed of turkey waste at 30° C. for 18 hours and was inoculated into a main culture medium whose composition was:

| | |
|---|---|
| Blackstrap molasses | percent 1.0 |
| $(NH_4)_2SO_4$ | do 1.0 |
| $KH_2PO_4$ | do 0.2 |
| $MgSO_4 7H_2O$ | do 0.05 |
| $Fe^{++}$ | p.p.m 2 |
| $Mn^{++}$ | p.p.m 2 |
| $CaCO_3$ | percent 1.5 |

The medium was held at 30° C., and 2% turkey waste was added after 10, 24 and 48 hours. After 72 hours of cultivation, the amount of alpha amylase accumulated in the culture broth was 80 DNS units. Repetition of the same experiment using Corn steep liquor in place of the turkey excrement produced 1.3 DNS units. Other carbon sources selected from Table 6 showed similar results.

EXAMPLE 14

500 ml. of seed culture broth of *Bacillus cereus* A.T.C.C. 21771 in a medium consisting of: $(NH_4)_2HPO_4 0.5\%$, $KH_2PO_4 0.2\%$, $MgSO_4 7H_2O$ 0.05% and yeast extract 0.05% is held at 30° C. for 20 hours with shaking and is inoculated into 200 ml. of a main culture medium in a 1000 ml. flask. The mixture is cultivated at 30° C. with shaking. The medium is composed of:

|  | Percent |
|---|---|
| $(NH_4)_2SO_4$ | 0.5 |
| $(NH_4)_2HPO_4$ | 0.5 |
| $KH_2PO_4$ | 0.2 |
| $K_2HPO_4$ | 0.7 |
| $MgSO_4 7H_2O$ | 0.05 |
| $MnCl_2O$ | 2 |
| $FeCl_2O$ | 2 |
| Yeast extract | 0.02 |
| pH 7.4 | |

After 24 hours of cultivation, 3% chicken waste was added. At the end of a 48-hour fermentation period, the alpha amylase content of the broth was 1 DNS unit ml. A similar experiment using Corn steep liquor rather than chicken waste was made and resulted in the production of 0 DNS units of alpha amylase. Soy bean oil and wheat chaff substitutions produce similar data.

EXAMPLE 15

*Bacillus cereus* 21769 was cultivated in a medium consisting of: Yeast extract 0.37, malt extract 0.3% and soy bean oil —1%, pH 6, and further cultivated in the same culture medium and by the same method as in Example 14. At the end of the 48-hour fermentation period, alpha amylase in the fermented broth amounted to 2 DNS/ml.

EXAMPLE 16

A starch culture medium was prepared and inoculated with *Bacillus cereus* 21770 and cultivated at 37° C. for 20 hours with shaking. The 300 ml. of the culture broth so obtained were inoculated into 5 liters of a main culture medium composed of:

| | Percent |
|---|---|
| Starch (potatoes) | 0.2 |
| $(NH_4)_2SO_4$ | 0.5 |
| $(NH_4)_2HPO_4$ | 0.5 |
| $K_2HPO_4$ | 0.1 |
| $KH_2PO_4$ | 0.2 |
| $MgSO_4 7H_2O$ | 0.05 |
| Yeast extract | 0.02 |
| pH 6.5. | |

The medium was placed in a 10-liter fermentor and the fermentation was carried out at 30° C. with the air flowing at 10 liters/min. with stirring at 300 r.p.m. After 20 hours of fermentation, chicken waste was fed to the medium aseptically. Separately, 0.5% $(NH_4)_2HPO_4$ was added and the pH maintained with 15% aqueous ammonia solution. After 42 hours, 2 g./ml. 21 units alpha amylase was obtained in the broth.

EXAMPLE 17

Using *Bacillus cereus* 21771 the producedure described in Example 16 was repeated. After 8 hours, 0.03% glucose was added; and at the end of the 48-hour fermentation, the concentration of alpha amylase in the fermented broth reached 81 DNS units.

EXAMPLE 18

*Bacillus cereus* A.T.C.C. No. 21770 was cultured in a medium containing bouillon 1%, NaCl 0.5% and yeast extract 0.1%, at 30° C. for 18 hours; and further in a main culture medium following the procedures of Example 13, at 30° C. for 72 hours. An addition of 0.01% potassium citrate was made after 12 hours of cultivation, and 1.0% chicken waste was added after 12, 20, 30 and 40 hours. At the end of 72 hours, 36 DNS units alpha amylase was obtained in the broth. Repetition of the experiment using various carbon sources taken from Table 6 produce about 8–14 DNS units.

EXAMPLE 19

*Aspergillus niger* A.T.C.C. No. 15475 was inoculated into a medium of:

| | | |
|---|---|---|
| $KH_2PO_4$ | percent | 0.1 |
| $MgSO_4 7H_2O$ | percent | 0.05 |
| $(NH_4)_2SO_4$ | percent | 0.1 |
| Urea | percent | 0.25 |
| $MnCl_2$ | p.p.m | 0.2 |
| $FeCl_2$ | p.p.m | 0.2 |
| Chicken waste 120 mesh | percent | 2.0 |

The broth obtained after 20 hours at 30° C. was mixed with a main culture medium composed of:

| | Percent |
|---|---|
| Chicken waste 120 mesh | 2.0 |
| Propylene glycol | 1.5 |
| Urea | 0.25 |
| $KH_2PO_4$ | 0.2 |
| $MgSO_4 7H_2O$ | 0.05 |
| Corn steep liquor | 0.3 |

After 18 hours of cultivation at 28° C. with shaking, the medium was adjusted to pH 7 to 8 with urea solution. After 12, 18, 24, 36 and 48 hours, 2% ethanol were added. At the end of 62 hours, the amount of alpha amylase in the fermented broth reached 1.3 units.

EXAMPLE 20

*Bacillus cereus* A.T.C.C. No. 21768 was inoculated in a culture medium consisting of:

| | Percent |
|---|---|
| Nitrogen source, $NaNo_3$ | 0.6 |
| Chicken waste, hulls 120 mesh | 5.0 |
| $CaCO_3$ | 2 |
| Acetate buffer, pH | 6.8 |
| $CaCl_2$ | 0.1 |

The broth obtained after 24 hours at 37° C. was mixed with a main culture medium comprising:

| | Percent |
|---|---|
| Chicken waste, 120 mesh | 2.0 |
| Acetic acid | 1.0 |
| $(NH_4)_2SO_4$ | 0.5 |
| Urea | 0.5 |
| $KH_2PO_4$ | 0.2 |
| $K_2HPO_4$ | 0.2 |
| $MgSO_4 7H_2O$ | 0.05 |
| Aji-eki | 1.5 |

After 72 hours, the concentration of alpha amylase amounted to 29 units.

Fowl excrement utilization and analysis

According to the teachings of this invention fowl excrement can serve as: (1) the original source for isolating the new alpha amylase producing microorganisms of this invention, (2) the sole ingredient in nutrient media for the new alpha amylase producing organisms of this invention as well as the sole nutrient for previously known alpha amylase producing microorganisms selected from the groups hereinafter described, and (3) a supplement to previously known nutrient media which can be used in the fermentation of both the new microorganisms of this invention and many previously known microorganisms hereinafter described.

The isolation and identification of this invention's new alpha amylase producing microorganisms from wet (non-sterile) fowl excrement sources is described in Example 2 of this application. The methods for obtaining the dried (sterile) fowl excrement used in the nutrient aspects of this invention are disclosed in assignee's pending U.S. patent application Ser. No. 80,517 filed Oct. 7, 1970. This application discloses suitable methods of collecting, sterilizing, drying, grinding and fractionating fowl excrement, particularly that obtained from commercial chicken and turkey farms. This patent application discloses that fowl excrement has a typical analysis of:

| Ingredient: | Percent by weight |
|---|---|
| Crude fats | 2.4 |
| Silicates | 1.6 |
| Carbohydrates | 8.9 |
| Phosphorus | 2.0 |
| Calcium | 10.7 |
| Magnesium | 0.4 |
| Uric acid | 0–5.0 |
| Nitrogen | 4.6 |
| Crude fibers | 11.8 |
| Water | 5.0 |
| Remainder (inorganic anions and other carbon, hydrogen and oxygen moieties) | 47.6 |

This analysis makes it evident that a high percentage of fowl excrement contains sources of assimilable carbon, assimilable nitrogen and minor nutrients. Proteinaceous material is clearly available in the form of the crude fats, carbohydrates, and crude fibers. The above chemical analysis clearly implies that all fractions of fowl excrement will contain nutrient qualities, but the applicants have further discovered that particularly high alpha amylase yields are obtained when the particle size of the fowl excrement is of a size greater than 350 mesh. The applicant's data shows that it is even more preferable to use fowl excrement of a size greater than 120 mesh and most preferable to use as much fowl excrement as possible of a size of greater than 80 mesh. Applicants have found this correlation to be true up to sizes of 10 mesh. Although the applicants do not wish to be bound to any theory to explain these differentials, they believe that they can be explained by the fact that the larger fractions of fowl excrement tend to have higher carbohydrate contents.

EXAMPLE 21

Bacteria and yeasts of other known and widely varying genera are capable of producing alpha amylase on media whose sole or principal source of assimilable carbon and assimilable nitrogen is fowl excrement. The strains of microorganisms suitable for producing alpha amylase do not share readily recognizable features other than their ability to grow on a culture medium containing fowl excrement as the principal source of assimilable carbon and nitrogen and producing alpha amylase by metabolizing this medium. Employing screening tests based on these properties, we have found numerous suitable microorganisms in nature and in culture collections without exhausting the field of search.

Table 7 below lists the new strains of this invention along with many previously known microorganisms, as well as their growing ability on a fowl excrement media. This growth was confirmed in the following manner. Plate cultures of the microorganisms were incubated for 5 days at 30° C. and a piece of the liquid contents were transferred to filter paper by a diffusion technique. The alpha amylase content of each culture medium was calculated by the dinitrosalicylic acid procedure as well as other methods of enzymology. Chromotographic data was used to determine what sugars were produced. The growth of microorganisms is determined by plate counts and utilization of sugar, DNA and RNA. The results are evaluated in Table 7 on an arbitrary, but reproducible scale, the symbols used having the following meaning.

++++ Excellent
+++ Good
++ Fair
+ Significant
— Trace

The media employed had the following compositions.

| | Media | Size | Media |
|---|---|---|---|
| A | Chicken excrement | 350 | [1] 1.0 |
| B | do | 120 mesh | [1] 2.0 |
| C | Turkey excrement | do | [1] 2.0 |
| D | Chicken excrement | 80 mesh | [1] 2.0 |
| E | do | do | [1] 5.0 |
| F | do | do | [1] 10.0 |
| G | do | do | [1] 2.0 |
| | $CaCl_2$ | | [1] 0.1 |
| | $CaCO_3$ | | [1] 2.0 |
| | $MgCl_2$ | | [1] 0.1 |
| | $FeCl_2$ | | [1] 0.1 |
| | pH | | 6 |
| H | Chicken excrement | 80 mesh | [1] 5.0 |
| | $CaCO_3$ | | [1] 2.0 |
| | $CaCl_2$ | | [1] 0.1 |
| | $MgCl_2$ | | [1] 0.1 |
| | $FeCl_2$ | | [1] 0.1 |
| | pH | | 6 |
| I | Chicken excrement | 80 mesh | [1] 3.0 |
| | Cellobiose | | [1] 3.0 |
| | $MgSO_4-.7H_2O$ | | [2] 10 |
| | KCl | | [2] 5 |
| | $CaCl_2-.5H_2O$ | | [2] 0.2 |
| | Yeast extract | | [3] 1.0 |
| | Distilled $H_2O$ | | [4] 1,000 |
| J | Chicken excrement | 120 mesh | [1] 5.0 |
| | Cellobiose | | [1] 0.1 |
| | $MgSO_4-.7H_2O$ | | [2] 10 |
| | KCl | | [2] 5 |
| | $CaCl_2-5H_2O$ | | [2] 0.2 |
| | Yeast extract | | [3] 1.0 |
| | Corn steep liquor | | [1] 7.0 |
| | Distilled $H_2O$ | | [4] 1,000 |
| K | Turkey excrement | 350 mesh | [1] 5.0 |
| | Cellobiose | | [1] 0.1 |
| | $MgSO_4-.7H_2O$ | | [2] 10 |
| | KCl | | [2] 5 |
| | $CaCl_2-5H_2O$ | | [2] 0.2 |
| | Yeast extract | | [3] 1.0 |
| | Distilled $H_2O$ | | [4] 1,000 |
| L | Turkey excrement | 350 mesh | [1] 5.0 |
| | Cellobiose | | [1] 0.1 |
| | $MgSO_4-.7H_2O$ | | [2] 10 |
| | KCl | | [2] 5 |
| | $CaCl_2-5H_2O$ | | [2] 0.2 |
| | Yeast extract | | [3] 1.0 |
| | Distilled $H_2O$ | | [4] 1,000 |

[1] Percent of media by weight.
[2] Grams per liter.
[3] Grams.
[4] Milliliters.

TABLE 7

| Nutrient media | A | B | C | D | E | F | G | H | I | J | K | L |
|---|---|---|---|---|---|---|---|---|---|---|---|---|
| Aspergillus awamori ATCC 11358 | + | + | + | + | ++ | — | + | +++ | +++ | ++ | + | + |
| Aspergillus diastaticus | + | + | + | ++ | ++ | — | + | ++ | ++ | ++ | + | + |
| Aspergillus flavus ATCC 11495 | + | + | + | + | ++ | — | + | ++ | ++ | ++ | + | + |
| Aspergillus foetidus ATCC 14916 | — | — | + | + | ++ | — | + | +++ | +++ | ++ | + | + |
| Aspergillus niger ATCC 15475 | + | + | + | + | ++ | — | + | ++ | ++ | ++ | + | + |
| Aspergillus oryzae ATCC 7561 | — | + | + | + | ++ | — | + | ++ | +++ | ++ | +++ | ++ |
| Aspergillus oryzae ATCC 9102 | + | ++ | + | + | ++ | — | + | ++ | ++ | ++ | — | — |
| Aspergillus phoenicis ATCC 15556 | — | — | — | — | — | — | — | — | — | — | — | — |
| Aspergillus ruber ATCC 9481 | | | | + | + | | ++ | — | + | ++ | ++ | — |
| Aspergillus saitol ATCC 11362 | | | | | | | | | | | | |
| Aspergillus terreus ATCC 11877 | — | — | — | + | ++ | — | + | ++ | ++ | + | ++ | ++ |
| Aspergillus usamii ATCC 11364 | — | — | — | + | ++ | — | + | ++ | ++ | + | + | + |
| Bacillus amyloliquefaciens ATCC 23843 | + | + | + | ++ | ++ | + | +++ | ++ | ++ | ++ | + | + |
| Bacillus brevis ATCC 10068 | + | + | + | + | ++ | — | + | +++ | +++ | ++ | + | + |
| Bacillus cereus ATCC 944 | + | + | + | + | ++ | — | + | ++ | ++ | + | + | + |
| Bacillus cereus ATCC 7004 | — | — | + | + | ++ | — | + | ++ | ++ | + | + | — |
| Bacillus cereus ATCC 12480 | — | — | — | + | ++ | — | + | ++ | ++ | + | + | — |
| Bacillus cereus ATCC 21768 | ++ | +++ | +++ | ++ | +++ | — | ++ | ++++ | ++++ | +++ | +++ | + |
| Bacillus cereus ATCC 21769 | ++ | +++ | +++ | +++ | +++ | — | ++ | ++++ | ++++ | +++ | +++ | ++ |
| Bacillus cereus ATCC 21770 | ++ | +++ | +++ | +++ | +++ | ++ | ++ | ++++ | ++++ | +++ | +++ | ++ |
| Bacillus cereus ATCC 21771 | ++ | +++ | +++ | +++ | ++++ | ++ | ++ | ++++ | ++++ | +++ | +++ | ++ |
| Bacillus cereus ATCC 21772 | ++ | +++ | +++ | +++ | ++++ | — | ++ | ++++ | ++++ | +++ | +++ | ++ |
| Candida solami ATCC 14440 | — | — | + | + | + | — | + | ++ | ++ | ++ | — | — |
| Candida parapsolosis | | | | | | | | | | | | |
| Cellumonas biazotea ATCC 486 | — | + | — | + | + | — | + | ++ | ++ | ++ | — | — |
| Cellumonas fimi ATCC 15724 | — | + | — | — | — | — | — | — | — | — | — | — |
| Corynebacteria lilium ATCC 15990 | — | — | — | — | — | — | — | — | — | — | — | — |
| Corynebacteria hydrocarboclastus 19556 | — | — | — | — | — | — | — | — | — | — | — | — |
| Pseudomonas aerginosa ATCC 7706 | — | — | — | — | — | — | — | — | — | — | — | — |
| Pseudomonas amyloderamosa ATCC 21262 | — | — | — | — | + | — | + | ++ | — | — | — | — |
| Pseudomonas atrofaciens ATCC 9004 | — | — | — | — | — | — | — | — | — | — | — | — |

Fermentations are again carried out by employing microorganisms listed in Table 7 in the same nutrient media and under the same conditions as those described in Example 21 except that the fowl excrement percentages are changed as indicated in Table 8. The fowl excrement is sized to 350 mesh. The medium employed has a carbon source of 7.0% corn steep liquor. The amylase production of these various microorganisms expressed in DNS units is given in Table 8 below.

Similar excrements are carried out using media A, C, G and K of Example 21 and similar results are obtained.

EXAMPLE 23

Fermentations were carried out by employing each of the microorganism listed in Table 7 under the same fermentation condition listed in Example 21 media J except the fowl excrement sized to 120 mesh was added to the nutrient media in the amounts shown in Table 8. This comparison shows the beneficial results of using the larger fractions of fowl excrement.

| Microorganism employed | Alpha amylase produced | | | | | | | | | | |
|---|---|---|---|---|---|---|---|---|---|---|---|
| | 0.0% CW | 0.1% CW | 2% CW | 4% CW | 6% CW | 8% CW | 10% CW | 20% CW | 4% TW | 5% TW | 8% TW |
| Aspergillus diastaticus | 0 | 0 | 1.7 | 1.9 | 2.1 | 0 | 0 | 0 | 1.7 | 1.9 | 0 |
| Aspergillus flavus ATCC 11495 | 0 | 0 | 1.5 | 1.6 | 2.0 | 1.1 | 0 | 0 | 1.5 | 1.0 | 0 |
| Aspergillus foetidus ATCC 14916 | 0 | 0 | 1.0 | 1.0 | 0 | 0 | 0 | 0 | 0 | 0 | 0 |
| Aspergillus niger ATCC 15475 | 0 | 0 | 1.3 | 1.0 | 0 | 0 | 0 | 0 | 1.1 | 1.3 | 0 |
| Aspergillus oryzae ATCC 7561 | 0 | 0 | 1.0 | 1.1 | 1.1 | 7 | 0 | 0 | 0 | 0 | 0 |
| Aspergillus oryzae ATCC 9102 | 0 | 0 | 1.1 | 1.5 | 1.0 | 0 | 0 | 0 | 0 | 0 | 0 |
| Aspergillus phoenicis ATCC 15556 | 0 | 0 | 0 | 1.0 | 1.1 | 0 | 0 | 0 | 0 | 0 | 0 |
| Aspergillus ruber ATCC 9481 | 0 | 0 | 0 | 0 | 0 | 0 | 0 | 0 | 1.7 | 2.1 | 3.0 |
| Aspergillus saitoi ATCC 11362 | 0 | 0 | 0 | 0 | 0 | 0 | 0 | 0 | 1.0 | 0 | 0 |
| Aspergillus usamii ATCC 11364 | 0 | 0 | 0 | 0 | 0 | 0 | 0 | 0 | 1.5 | 1.9 | 2.3 |
| Bacillus amyloliquefaciens ATCC 23843 | 0.5 | 0.5 | 1.1 | 1.3 | 1.3 | 0 | 0 | 0 | 1.1 | 1.4 | 1.4 |
| Bacillus brevis ATCC 10068 | 0.1 | 0.1 | 1.3 | 1.5 | 1.5 | 0 | 0 | 0 | 1.2 | 1.4 | 1.4 |
| Bacillus cereus ATCC 21768 | 0.2 | 2.3 | 9 | 38 | 69 | 78 | 0 | 0 | 78 | 80 | 96 |
| Bacillus cereus ATCC 21769 | 0.2 | 2.3 | 2.8 | 46 | 71 | 76 | 0 | 0 | 78 | 80 | 93 |
| Bacillus cereus ATCC 21770 | 0.3 | 2.5 | 2.7 | 42 | 63 | 61 | 0 | 0 | 83 | 86 | 91 |
| Bacillus cereus ATCC 21771 | 0.2 | 2.3 | 2.7 | 46 | 71 | 60 | 0 | 0 | 71 | 75 | 0 |
| Bacillus cereus ATCC 21772 | 0.2 | 2.7 | 2.8 | 49 | 71 | 63 | 0 | 0 | 71 | 75 | 0 |
| Cellumonas biazotea ATCC 486 | 6.0 | 0.5 | 3 | 9 | 0 | 0 | 0 | 0 | 0 | 0 | 0 |
| Cellumonas fimi ATCC 15724 | .900 | 1.1 | 4 | 3 | 0 | 0 | 0 | 0 | 0 | 0 | 0 |
| Cellumonas vibrioides ATCC 11764 | 0 | 1.0 | 6 | 5 | 0 | 0 | 0 | 0 | 0 | 0 | 0 |
| Cellumonas cartalyticum ATCC 21681 | 0 | 0.5 | 1 | 1 | 0 | 0 | 0 | 0 | 0 | 0 | 0 |
| Cellumonas flavigena ATCC 482 | 0 | 0.5 | 5 | 1 | 0 | 0 | 0 | 0 | 0 | 0 | 0 |
| Pseudomonas aerginosa ATCC 7706 | 0 | 0 | 0 | 0 | 0 | 0 | 0 | 0 | 1.5 | 2 | 9 |

NOTE.—CW=chicken waste; TW=turkey waste.

Similar excrements are carried out using media A, C, D, G, K and L with similar results being obtained.

TABLE 8

| Microorganism employed | Alpha amylase produced | | | | | | | | | | |
|---|---|---|---|---|---|---|---|---|---|---|---|
| | 0.0% CW | 0.1% CW | 2% CW | 4% CW | 6% CW | 8% CW | 10% CW | 20% CW | 4% TW | 5% TW | 8% TW |
| Aspergillus diastaticus | 0 | 1 | 1.1 | 2.0 | 2.1 | 1.6 | 0 | 0 | 2.7 | 3.1 | 2.1 |
| Aspergillus flavus ATCC 11495 | 0 | 1.3 | 1.6 | 2.4 | 1.5 | 0 | 0 | 0 | 1.7 | 1.9 | 1.3 |
| Aspergillus foetidus ATCC 14916 | 0 | 3.0 | 1.8 | 2.4 | 1.9 | 0 | 0 | 0 | 1.7 | 1.9 | 1.0 |
| Aspergillus niger ATCC 15475 | 0 | 0 | .5 | 1.3 | 1.1 | 0 | 0 | 0 | 1.1 | 1.8 | 1.1 |
| Aspergillus oryzae ATCC 7561 | 0 | 0 | 0 | 1.0 | 0 | 0 | 0 | 0 | 3.9 | 4.1 | 3.6 |
| Aspergillus oryzae ATCC 9102 | 0 | 0 | 1.4 | 1.9 | 1.0 | 0 | 0 | 0 | 3.0 | 3.8 | 3.0 |
| Aspergillus phoenicis ATCC 15556 | 0 | 0 | 0 | 0 | 0 | 0 | 0 | 0 | 1.1 | 1.3 | 1.1 |
| Aspergillus usamii ATCC 11364 | 0 | 0 | 0 | 0 | 0 | 0 | 0 | 0 | 2.9 | 3.1 | 3.0 |
| Bacillus amyloliquefaciens ATCC 23843 | 0.5 | 1.4 | 1.8 | 2.1 | 1.5 | 1.0 | 0 | 0 | 1.5 | 1.9 | 1.4 |
| Bacillus brevis ATCC 10068 | 0.5 | 1.1 | 1.4 | 2.0 | 1.0 | 0 | 0 | 0 | 1.0 | 1.0 | 1.0 |
| Bacillus cereus ATCC 12480 | 0.5 | 0 | 0 | 0 | 0 | 0 | 0 | 0 | 1.1 | 1.6 | 1.1 |
| Bacillus cereus ATCC 21768 | 0.5 | 3 | 7 | 28 | 36 | 12 | 0 | 0 | 29 | 36 | 29 |
| Bacillus cereus ATCC 21769 | 0.1 | 7 | 14 | 32 | 38 | 24 | 17 | 0 | 30 | 36 | 21 |
| Bacillus cereus ATCC 21770 | 0 | 9 | 15 | 32 | 30 | 0 | 0 | 0 | 33 | 39 | 25 |
| Bacillus cereus ATCC 21771 | 0 | 9 | 11 | 40 | 46 | 0 | 21 | 0 | 30 | 37 | 29 |
| Bacillus cereus ATCC 21772 | 0.1 | 11 | 18 | 43 | 48 | 0 | 0 | 0 | 0 | 0 | 0 |
| Candida solami ATCC 14440 | 0 | 0 | 0 | 1.0 | 0 | 0 | 0 | 0 | 0 | 0 | 0 |
| Candida parapsolosis ATCC | 0 | 0 | 0 | 1.1 | 0 | 0 | 0 | 0 | 0 | 0 | 0 |
| Candida guillier mondii ATCC 9390 | 0 | 0 | 0 | 1.1 | 0 | 0 | 0 | 0 | 0 | 0 | 0 |
| Cellumonas biazotea ATCC 486 | 0 | 0 | 1.1 | 1.0 | 0 | 0 | 0 | 0 | 0 | 0 | 0 |
| Cellumonas fimi ATCC 15724 | 0 | 0 | 1.3 | 2.0 | 0 | 0 | 0 | 0 | 0 | 0 | 0 |
| Corynebacteria hydrocarboclastus ATCC 19556 | 0 | 0 | 0 | 1.1 | 0 | 0 | 0 | 0 | 0 | 0 | 0 |
| Pseudomonas amyloderamosa ATCC 21262 | 0 | 0 | 0 | 1.1 | 0 | 0 | 0 | 0 | 0 | 0 | 0 |
| Pseudomonas atrofaciens ATCC 9004 | 0 | 0 | 0 | 1.1 | 0 | 0 | 0 | 0 | 0 | 0 | 0 |

EXAMPLE 24

Fermentations are again carried out using the conditions of Example 23 media J except that the fowl excrement was of size 80 mesh or greater. The results indicate that alpha amylase production was improved with the larger fractions.

| Microorganism employed | Alpha amylase produced | | | | | | | | | | |
|---|---|---|---|---|---|---|---|---|---|---|---|
| | 0.0% CW | 0.1% CW | 2% CW | 4% CW | 6% CW | 8% CW | 10% CW | 20% CW | 4% TW | 5% TW | 8% TW |
| Aspergillus diastaticus ATCC | 0 | 0 | 2.9 | 1.0 | 2.3 | 0 | 0 | 0 | 17 | 24 | 0 |
| Aspergillus flavus ATCC 11495 | 0 | 0 | 2.4 | 11 | 19 | 0 | 0 | 0 | 0 | 20 | 0 |
| Aspergillus foetidus ATCC 14916 | 0 | 0 | 2.0 | 11 | 19 | 0 | 0 | 0 | 0 | 0 | 0 |
| Aspergillus niger ATCC 15475 | 0 | 0 | 2.3 | 10 | 18 | 10 | 0 | 0 | 12 | 19 | 0 |
| Aspergillus oryzae ATCC 7561 | 0 | 0 | 2.3 | 10 | 17 | 0 | 0 | 0 | 0 | 0 | 0 |
| Aspergillus phoenicis ATCC 15556 | 0 | 0 | 2.7 | 10 | 19 | 0 | 0 | 0 | 0 | 0 | 0 |
| Aspergillus ruber ATCC 9481 | 0 | 0 | 0 | 0 | 17 | 0 | 0 | 0 | 0 | 0 | 0 |
| Aspergillus saitoi ATCC 11362 | 0 | 0 | 0 | 0 | 0 | 0 | 0 | 0 | 21 | 28 | 20 |
| Bacillus amyloliquefaciens ATCC 23843 | 0 | 1.3 | 8 | 9 | 10 | 0 | 0 | 0 | 10 | 11 | 3 |
| Bacillus brevis ATCC 10068 | 0 | 1.1 | 6 | 7 | 6 | 0 | 0 | 0 | 5 | 5 | 5 |
| Bacillus cereus ATCC 21768 | 0 | 4.7 | 35 | 45 | 88 | 100 | 0 | 0 | 87 | 91 | 90 |
| Bacillus cereus ATCC 21769 | 0 | 4.3 | 30 | 40 | 81 | 89 | 0 | 0 | 86 | 90 | 88 |
| Bacillus cereus ATCC 21770 | 0 | 4.7 | 31 | 41 | 82 | 90 | 0 | 0 | 88 | 93 | 90 |
| Bacillus cereus ATCC 21771 | 0 | 4.6 | 29 | 40 | 81 | 90 | 0 | 0 | 80 | 90 | 0 |
| Bacillus cereus ATCC 21772 | 0 | 4.3 | 31 | 42 | 83 | 93 | 0 | 0 | 80 | 91 | 0 |
| Cellumonas biazotea ATCC 486 | 0 | 1.1 | 6 | 18 | 0 | 0 | 0 | 0 | 0 | 0 | 0 |
| Cellumonas fimi ATCC 15724 | 0 | 2.0 | 12 | 26 | 0 | 0 | 0 | 0 | 0 | 0 | 0 |
| Cellumonas vibrioides ATCC 11764 | 0 | 2.0 | 14 | 34 | 0 | 0 | 0 | 0 | 0 | 0 | 0 |
| Cellumonas cartalyticum ATCC 21681 | 0 | 1.0 | 6 | 20 | 0 | 0 | 0 | 0 | 0 | 0 | 0 |
| Cellumonas flavigena ATCC 482 | 6 | 1.3 | 8 | 23 | 0 | 0 | 0 | 0 | 0 | 0 | 0 |
| Pseudomonas aeroginosa ATCC 7706 | 0 | 0 | 0 | 0 | 0 | 0 | 0 | 0 | 3.0 | 6 | 2.0 |

Note.—CW = chicken waste; TW = turkey waste.

Similar results are obtained using media A, C, G and K of Example 21.

EXAMPLE 25

Fermentations were carried out by employing microorganisms listed in Table 7 under the same conditions as in Example 21 media J, except that the carbon source was 7% wheat bran rather than 7% corn steep liquor.

EXAMPLE 26

Fermentations were carried out by employing microorganisms listed in Table 7 under the same conditions as in Example 21. The medium employed were the same as in Example 21 media J, except that the carbon source was 7% soy bean oil rather than 7% corn steep liquor.

| Microorganism employed | Alpha amylase produced | | | | | | | | | | |
|---|---|---|---|---|---|---|---|---|---|---|---|
| | 0.0% CW | 0.1% CW | 2% CW | 4% CW | 6% CW | 8% CW | 10% CW | 20% CW | 4% TW | 5% TW | 8% TW |
| Aspergillus diastaticus | 0 | 1.3 | 2.0 | 13.0 | 35 | 16 | 0 | 0 | 21 | 29 | 0 |
| Aspergillus flavus ATCC 11495 | 0 | 1.1 | 3.5 | 14 | 36 | 32 | 0 | 0 | 18 | 23 | 0 |
| Aspergillus foetidus ATCC 14916 | 0 | 1.0 | 3.0 | 15 | 35 | 20 | 0 | 0 | 3 | 0 | 0 |
| Aspergillus niger ATCC 15475 | 0 | 1.6 | 3.3 | 14 | 35 | 18 | 0 | 0 | 19 | 23 | 0 |
| Aspergillus oryzae ATCC 9102 | 0 | 1.5 | 3.7 | 15 | 36 | 15 | 0 | 0 | 0 | 0 | 0 |
| Aspergillus phoenicis ATCC 15556 | 0 | 1.0 | 3.6 | 14 | 35 | 16 | 0 | 0 | 0 | 0 | 0 |
| Aspergillus saitoi ATCC 11362 | 0 | 1.0 | 1.1 | 14 | 35 | 12 | 0 | 0 | 0 | 0 | 0 |
| Aspergillus terreus ATCC 11877 | 0 | 1.0 | 1.3 | 6 | 35 | 0 | 0 | 0 | 27 | 34 | 0 |
| Aspergillus awamori ATCC | 0 | 0 | 0 | 0 | 0 | 0 | 0 | 0 | 0 | 0 | 24 |
| Aspergillus usamii ATCC 11364 | 0 | 1.0 | 1.4 | .3 | 8 | 0 | 0 | 0 | 15 | 20 | 5 |
| Bacillus amyloliquefaciens ATCC 23843 | 0.1 | 2.0 | 10 | 12 | 8 | 0 | 0 | 0 | 15 | 19 | 8 |
| Bacillus brevis ATCC 10068 | 0.1 | 1.8 | 9 | 12 | 8 | 0 | 0 | 0 | 5 | 7 | 5 |
| Bacillus cereus ATCC 21768 | 0.6 | 11 | 23 | 63 | 111 | 147 | 16 | 0 | 96 | 103 | 102 |
| Bacillus cereus ATCC 21769 | 0.6 | 11 | 30 | 60 | 110 | 132 | 11 | 0 | 96 | 105 | 102 |
| Bacillus cereus ATCC 21770 | 0.5 | 19 | 30 | 58 | 108 | 138 | 0 | 0 | 99 | 111 | 101 |
| Bacillus cereus ATCC 21771 | 0 | 11 | 29 | 60 | 110 | 131 | 16 | 0 | 91 | 101 | 0 |
| Bacillus cereus ATCC 21772 | 0 | 16 | 31 | 63 | 108 | 131 | 0 | 0 | 90 | 100 | 0 |
| Cellumonas biazotea ATCC 486 | 0 | 2.0 | 10 | 24 | 24 | 0 | 0 | 0 | 0 | 0 | 0 |
| Cellumonas fimi ATCC 15724 | 0 | 2.5 | 14 | 26 | 24 | 0 | 0 | 0 | 0 | 0 | 0 |
| Cellumonas vibrioides ATCC 11764 | 0 | 1.6 | 10 | 23 | 19 | 0 | 0 | 0 | 0 | 0 | 0 |
| Cellumonas cartalyticum ATCC 21681 | 0 | 1.5 | 11 | 23 | 25 | 0 | 0 | 0 | 0 | 0 | 0 |
| Cellumonas flavigena ATCC 482 | 0 | 1.3 | 11 | 24 | 24 | 0 | 0 | 0 | 0 | 0 | 0 |
| Pseudomonas aeroginosa ATCC 7706 | 0 | 0 | 0 | 0 | 0 | 0 | 0 | 0 | 5 | 11 | 20 |

Note.—CW = chicken waste; TW = turkey waste.

| Microorganism employed | Alpha amylase produced | | | | | | | | | | |
|---|---|---|---|---|---|---|---|---|---|---|---|
| | 0.0% CW | 0.1% CW | 2% CW | 4% CW | 6% CW | 8% CW | 10% CW | 20% CW | 4% TW | 5% TW | 8% TW |
| Aspergillus diastaticus | 0 | 0 | 0 | 0 | 0 | 0 | 0 | 0 | .5 | 1.0 | 0 |
| Aspergillus flavus ATCC 11495 | 0 | 0 | 0 | 0 | 0 | 0 | 0 | 0 | 1.0 | 1.0 | 0 |
| Aspergillus niger ATCC 15475 | 0 | 0 | 0 | 0 | 0 | 0 | 0 | 0 | 0 | .5 | 0 |
| Bacillus cereus ATCC 21868 | 0 | 1.6 | 3.6 | 9 | 12 | 0 | 0 | 0 | 12 | 14 | 0 |
| Bacillus cereus ATCC 21769 | 0 | 1.6 | 3.6 | 8 | 14 | 0 | 0 | 0 | 12 | 14 | 0 |
| Bacillus cereus ATCC 21770 | 0 | 1.3 | 3.1 | 9 | 12 | 0 | 0 | 0 | 14 | 14 | 0 |
| Bacillus cereus ATCC 21771 | 0 | 1.6 | 3.6 | 11 | 12 | 0 | 0 | 0 | 12 | 14 | 0 |
| Bacillus cereus ATCC 21772 | 0 | 1.3 | 3.1 | 11 | 12 | 0 | 0 | 0. | 14 | 14 | 0 |

Note.—CW = chicken waste; TW = turkey waste.

EXAMPLE 27

Fermentations were carried out by employing microorganisms listed in Table 7 under the same conditions as in Example 21 media L except that the carbon source is 10% wheat chaff.

| Microorganism employed | Alpha amylase produced | | | | | | | | | |
|---|---|---|---|---|---|---|---|---|---|---|
| | 0.0% CW | 0.1% CW | 2% CW | 4% CW | 6% CW | 8% CW | 10% CW | 20% CW | 4% TW | 5% TW | 8% TW |
| Aspergillus diastaticus | 0 | 1.5 | 3.7 | 21 | 43 | 28 | 0 | 0 | 31 | 34 | 8 |
| Aspergillus flavus ATCC 11495 | 0 | 1.2 | 4.4 | 21 | 43 | 30 | 0 | 0 | 28 | 31 | 11 |
| Aspergillus foetidus ATCC 14916 | 0 | 1.3 | 4.0 | 21 | 46 | 28 | 0 | 0 | 15 | 18 | 3 |
| Aspergillus niger ATCC 15475 | 0 | 1.9 | 4.3 | 20 | 45 | 30 | 0 | 0 | 31 | 34 | 6 |
| Aspergillus oryzae ATCC 7561 | 0 | 1.7 | 4.6 | 0 | 0 | 0 | 0 | 0 | 0 | 0 | 0 |
| Aspergillus oryzae ATCC 9102 | 0 | 1.3 | 4.2 | 21 | 43 | 31 | 0 | 0 | 0 | 0 | 0 |
| Aspergillus phoenicis ATCC 15556 | 0 | 1.3 | 4.1 | 21 | 45 | 28 | 0 | 0 | 0 | 0 | 0 |
| Aspergillus ruber ATCC 9481 | 0 | 1.4 | 4.1 | 22 | 43 | 31 | 0 | 0 | 0 | 0 | 0 |
| Aspergillus saitol ATCC 11362 | 0 | 1.3 | 4.0 | 21 | 45 | 28 | 0 | 0 | 35 | 39 | 31 |
| Aspergillus usamii ATCC 11364 | 0 | 1.3 | 3.6 | 9 | 19 | 0 | 0 | 0 | 0 | 0 | 0 |
| Bacillus amyloliquifaciens ATCC 23843 | 0 | 3.1 | 11 | 20 | 17 | 0 | 0 | 0 | 26 | 28 | 16 |
| Bacillus brevis ATCC 10068 | 0 | 2.6 | 21 | 21 | 17 | 0 | 0 | 0 | 28 | 31 | 11 |
| Bacillus subtilis | 0 | 0 | 0 | 0 | 0 | 0 | 0 | 0 | 9 | 11 | 9 |
| Bacillus cereus ATCC 21768 | 0 | 3.0 | 9.0 | 110 | 89 | 96 | 21 | 0 | 93 | 101 | 108 |
| Bacillus cereus ATCC 21769 | 0 | | 8.1 | 7.4 | 92 | 99 | 30 | 0 | 96 | 100 | 106 |
| Bacillus cereus ATCC 21770 | 0 | | 6.3 | 7.2 | 96 | 103 | 50 | 0 | 96 | 102 | 107 |
| Bacillus cereus ATCC 21771 | 0 | | 7.0 | 7.1 | 92 | 140 | 32 | 0 | 93 | 101 | 0 |
| Bacillus cereus ATCC 21772 | 0 | | 7.3 | 23 | 100 | 142 | 32 | 0 | 95 | 101 | 0 |
| Cellumonas biazotea ATCC 486 | 0 | 3.0 | 14 | 28 | 36 | 16 | 0 | 0 | 0 | 0 | 0 |
| Cellumonas fimi ATCC 15724 | 0 | 3.5 | 15 | 30 | 38 | 10 | 0 | 0 | 0 | 0 | 0 |
| Cellumonas vibrioides ATCC 11764 | 0 | 3.0 | 17 | 33 | 36 | 11 | 0 | 0 | 0 | 0 | 0 |
| Cellumonas cartalyticum ATCC 21681 | 0 | 3.0 | 14 | 31 | 34 | 16 | 0 | 0 | 0 | 0 | 0 |
| Cellumonas flavigena ATCC 482 | 0 | 3.0 | 11 | 30 | 38 | 10 | 0 | 0 | 0 | 0 | 0 |

NOTE.—CW=chicken waste; TW=turkey waste.

EXAMPLE 28

Fermentations are again carried out by the microorganisms listed in Table 7 and under the same conditions as in Example 27 media J except that wheat chaff and 200 μ/g. of glycine were added to the media. The applicants have discovered that the five new microorganisms produced the following amounts of alpha amylase.

| Bacillus cereus | ATCC 21768 | ATCC 21769 | ATCC 21770 | ATCC 21771 | ATCC 21772 | Asperigillus nig., ATCC 15475 |
|---|---|---|---|---|---|---|
| 10% wheat chaff plus glycine | 330 | 203 | 85 | 5 | 30 | 1.0 |
| 5% wheat chaff plus glycine | 130 | 17 | 89 | 31 | 39 | 1.1 |

EXAMPLE 29

Repeat Example 28 using 5% and 2% chicken waste media. Results:

| Bacillus cereus | ATCC 21768 | ATCC 21769 | ATCC 21770 | ATCC 21771 | ATCC 21772 | Aspergillus nig., ATCC 15475 |
|---|---|---|---|---|---|---|
| 5% CW plus 200 μg. glycine | 135 | 33.50 | 94 | 42 | 29 | 2.85 |
| 3% CW plus 200 μg. glycine | 119 | 23.35 | 94 | 44 | 47 | 2.80 |

According to a particularly preferred embodiment of this invention fowl excrement can be employed as a supplement to those nutrient media which are used in conventional alpha amylase fermentation processes. This point is well illustrated in the examples of this application. However, the amounts of fowl excrement empolyed as a supplement in conventional nutrient media may vary over a relatively wide range. Concentrations as low as 0.01 and as high as 15 percent by weight of the conventional media are effective to increase the yield of alpha amylase. The applicants have discovered that concentrations in excess of 15 percent by weight confer no added advantages and in some cases concentrations above 5% act as inhibitors. The preferred concentration is therefore in the range of 1 to 5 percent and the most preferred is 2–5 percent by weight of the conventional media.

In using fowl excrement as a supplement to conventional nutrient media the applicants prefer to prepare a nutrient medium containing between 0.01 and 15% proteinaceous material and starch in amounts between 0.01 and 15%, the medium being made up to volume with water. Proteinaceous material suitable for use in the practice of our invention includes corn steep liquor, casein, dry yeast, fish meal, cottonseed meal, yeast extract, meat extract, soybean meal as well as mixtures of the above. We prefer to employ about 0.8% proteinaceous material in our nutrient media as this amount helps to insure good yields of amylase.

As assimilable carbon sources, our process can utilize glucose, arabinose, xylose, lactose, maltose, sucrose, etc. and various organic compounds, such as organic ammonium salts, organic nitrate, urea amino acids, corn steep liquor, peptone, casein, meat extracts, or soy products, etc. These materials of course can be used not only as a carbon source but also as digestible nitrogen source. Obviously we also use the uric acid in the chicken waste or turkey waste as a source of nitrogen. Other sources of nitrogen for this invention can be any organic or inorganic nitrogen-containing compound which is capable of releasing nitrogen in a form suitable for metabolic utilization by the microorganism(s) being harvested. In the organic category, the following compounds can be listed as exemplary nitrogen-containing compounds which can be used: proteins, acid-hydrolized proteins, enzyme-digested proteins, amino acids, yeast extract, asparagine, urea, uric acid etc. and it is obvious that such materials can also be utilized as carbon sources. For reasons of economy, it is ususally preferable to empoly inorganic nitrogen compounds, such as ammonia, ammonium hydroxide, or salts thereof, such as ammonium citrate, ammonium sulfate, ammonium phosphate, ammonium acid phosphate. As noted earlier, turkey and chicken waste can be used as the sole source of carbon and nitrogen. Another very convenient and satisfactory method of supplying nitrogen is to employ ammonium phosphate or ammonium acid phosphate, which can be added as the salt, per se, or can be produced in situ in the aqueous fermentation media by bubbling nascent nitrogen through the broth to which phosphoric acid was previously added, thereby forming ammonium acid phosphate.

Starch source which we can empoly in our nutrient media can be either soluble starches, or any of the common insoluble starches such as rice starch, corn starch, potato starch, arrow root starch, etc. The source of the starch is not considered to be critical and consequently, we intend to include in the term "starch" all of the various known forms, whatever their source. The role of starch is in the nature of a template or stimulant and the amount to be used falls within a range of about 0.01 to about 15%. We have obtained particularily satisfactory results employing 0.5% starch and therefore prefer this amount.

In addition to the carbon and nitrogen sources, it may be necessary with some organisms to supply requisite amounts of selected mineral nutrients in the nutrient medium in order to insure proper microorganism growth and maximize selectivity, viz, the conversion of fowl excrement and other nutrients to microorganism cells. Thus, potassium, sodium, iron, magnesium, calcium, manganese, phosphorous, and other nutrients can be included in the aqueous growth medium. However in most cases chicken waste and turkey waste contain enough minerals for growth and production of alpha amylase. In any event, these materials can be supplied in form of their salts, and preferably their water-soluble salts. For example, the potassium can be supplied as potassium chloride, phosphate sulfate, citrate, acetate, nitrate, etc. Iron and phosphorous can be supplied in the form of sulfates and phosphates, respectively, e.g., iron sulfate, iron phosphate. Usually most of the phosphorous is supplied as ammonia phosphate. When either ammonium phosphate or ammonium acid phosphate is used, it can serve as a combined source of both nitrogen and phosphorous (phosphate ion) for microorganism cell growth.

Following inoculation, the fermentations of this invention are conducted in a temperature ranging of about 20° C. to about 50° C. within which limits optimum growth occurs. However, we prefer to maintain the temperature in the range 26° to 37° C. and more particularly 32–35° C., at which temperature we have obtained the best results. During the fermentation, we maintain the pH of the medium at a value ranging between about 3.5 and 9.5 within which range the organism grows satisfactorily. However we prefer to employ a pH of about 7.2 at which we have obtained the best results.

The above organisms are aerobic and thus must be grown in the presence of air if adequate growth is to occur. Consequently, the organism can be grown on the surface of shallow layers of the medium or it can be grown in aerated submerged cultures, wherein deep tanks are employed with air being supplied thereto. We have employed both processes and found them satisfactory in the production of amylase, the deep tank method of course being the most satisfactory insofar as commercial production is concerned.

The fermentation is continued until the maximum yield of alpha amylase is obtained. Generally the time of the fermentation can be said to range from 12 to 72 hours although we have demonstrated that amylase activity is present in the medium in as short a period as four hours from the time the fermentation is begun. Generally the yield reaches a maximum after about 12–16 hours but considerably less than the longer time limit of 72 hours and consequently we prefer to carry out the fermentation for a period of about 30 hours.

Oxygen can be supplied to the cultivation medium in any form capable of being as similated readily by the inoculant microorganism, and oxygen-containing compounds can be used as long as they do not adversely affect microorganism cell growth. However, oxygen is conveniently supplied as an oxygen-containing gas, e.g., air, which contains from 19 to 22 wt. percent oxygen. While it is preferable to employ air, oxygen enriched air having more than 22 wt. percent oxygen e.g., enriched air having in excess of 22 wt. percent oxygen, can be used.

Following recovery of the precipitated amylase from the medium, the material is dried to obtain the final preparation having exceptional alpha amylase activity. The drying can be effected in vacuo at room temperature over calcium chloride or it can be effected at temperatures up to about 65° C. without decrease in the activity of the alpha amylase preparation.

Following production of the amylase in the nutrient medium, we then recover the amylase by first removing the solids from the medium and then precipitating the amylase from the cell-free medium by the addition of a precipitating agent more particularly described below. The solids can be removed from the medium in any of the usual ways such as for example by filtration, centrifugation, etc. Many times it is advantageous to employ the alpha amylase in solution and consequently in such situations precipitation is not necessary, the solution remaining following removal of the cells from the nutrient medium being satisfactory for this purpose. However concentration of the cell-free media improves their potency and such procedure is preferred.

After separating the solids from the nutrient medium and obtaining the cell-free solution of the amylase, we prefer to precipitate the alpha amylase by adding to the medium precipitating agents such as organic water-miscible solvents. Examples of such precipitation agents are ammonium sulfate, methyl ethyl ketone, acetone, dioxane, and lower aliphatic alcohols including methanol, ethanol, isopropanol, n-propyl alcohol, tertiary butyl alcohol, polyethylene, or mixtures thereof. We add enough of the solvent to precipitate all of the amylase but generally we have found that from about 0.5 to 2.0 volumes of the precipitating agent per volume of cell-free medium are sufficient to precipitate all of the alpha amylase. Generally we prefer to employ ammonium sulfate as the precipitating agent since it appears to give equally good results no matter what the concentration of amylase in the cell-free nutrient medium might be. We prefer to employ 2 volumes of polyethylene glycol per volume of cell-free nutrient medium containing the amylase since we are generally assured of complete precipitation when this amount is employed.

In connection with the precipitation of the alpha amylase, we have found it desirable to concentrate the cell-free nutrient medium prior to effecting the precipitation since such procedure decreases the amount of precipitating agent needed to obtain a given amount of amylase. We prefer to concentrate the solution to about one-tenth its original volume. Similarly, we have found it desirable to dialyze the nutrient medium prior to concentration since such procedure increases the purity of the final product. We prefer to dialyze the solution in cellophane bags against running tap water for a period of about 24 hours when such procedure is not impractical.

At the start-up of the fermentation the sterile growth medium is inoculated with the microorganism to be harvested, e.g., by use of previously cultivated inoculum in a growth media or the same one in which it is to be grown for production, e.g., as described above. The initial concentration of inoculum containing said microorganism at the outset of fermentation can vary widely, e.g., 0.0005 to 50.0 grams per liter of total fermentation media. Other inoculation procedures can be employed, e.g., use of an inoculum where said microorganism is previously grown on a media different from that in which the fermentation is to be conducted and then transferred to the fermentation vessel(s) etc. Normally the culture is grown for 14–18 hours before being inoculated in the production media.

Having thus disclosed our invention, we claim:

1. In a process for producing alpha amylase by fermenting under aerobic conditions, by means of microorganisms, a nutrient medium containing a source of starch, proteinaceous material and mineral salts, the improvement comprising using 0.01 to 10 percent by weight of dried fowl excrement sized between 10 and 350 mesh in said nutrient, medium, and wherein said microorganisms are selected from the group consisting of those Pseudomonas, Aspergillus, Cornyebacteria, Cellumonas, Bacillus and Candida capable of producing alpha amylase by metabolizing fowl excrement.

2. The process of claim 1 wherein the Bacillus are selected from the group consisting of *Bacillus brevis, Bacillus amyloliquefaciens,* and *Bacillus cereus.*

3. The process of claim 1 wherein the *Bacillus cereus* are selected from the group consisting of *Bacillus cereus* 21768, *Bacillus cereus* ATTC No. 21769; *Bacillus cereus* No. 21770; *Bacillus cereus* ATCC No. 21771 and *Bacillus cereus* No. 21772.

4. The process of claim 1 wherein the Pseudomonas are selected from the group consisting of: *Pseudomonas aeruginosa, Pseudomonas amyloderamosa* and *Pseudomonas atrofaciens.*

5. The process of claim 1 wherein the Aspergillus are selected from the group consisting of: *Aspergillus awamori, Aspergillus diastaticus, Aspergillus flavus, Aspergillus foetidus, Aspergillus niger, Aspergillus orzae, Aspergillus phoenicis, Aspergillus ruber, Aspergillus saitol, Aspergillus terras* and *Aspergillus usamii.*

6. The process of claim 1 wherein the Corynebacteria are selected from the group consisting of *Corynbacteria illium* and *Corynebacteria hydrocarboclastus.*

7. The process of claim 1 wherein the Cellumonas are selected from the group consisting of: *Cellumonas biazotea* and *Cellumonas fimi.*

8. The process of claim 1 wherein the Candida are selected from the group consisting of: *Candida solami* and *Candida parapsolosis.*

9. The process of claim 1 wherein the fowl waste is in the size range of 120 to 50 mesh.

10. The process of claim 1 wherein the fowl waste is in the size range of 100 to 80 mesh.

11. The process of claim 1 wherein the nutrient medium comprises water, fowl excrement, and between 0.01 and 15% percent starch and between 0.01 and 15 percent proteinaceous material.

12. The process of claim 1 wherein the mineral salts are selected from the group consisting of carbonates, phosphates, and sulfates of iron, manganese, calcium, potassium, sodium and magnesium.

13. The process of claim 11 wherein the starch source is selected from the group consisting of rice starch, corn starch, potato starch, arrowroot starch, wheat starch, cassava starch.

14. The process of claim 11 wherein the protein source is selected from the group consisting of soya bean meal, cotton seed meal, corn steep liquor, zein, prosein, casein, corn meal, homing, oat meal, rye meal, wheat meal, wheat chaff and broken rice.

15. The process of claim 1 wherein the fermentation is carried out in the temperature range of 18 to 70° C.

16. The process of claim 1 wherein the fermentation is carried out in the temperature range of 26 to 37° C.

17. The process of claim 1 wherein the fermentation is carried out in a pH range of 1 to 11.

18. The process of claim 1 wherein the fermentation is carried out in the pH range of 6.5 to 7.5.

19. The process of claim 1 wherein the fermentation is carried out for a period of 1 to 72 hours.

20. The process of claim 1 wherein the fermentation is carried out for a period of 25 to 35 hours.

21. The process of claim 1 wherein the fermentation is carried out in a nutrient medium containing growth promoting portions of wheat chaff and glycine in conjoint presence in said nutrient media.

22. The process of claim 20 wherein the wheat chaff is present in amounts of from 1 to 15% and the glycine is present in amounts of from 0.01 to 5%.

References Cited
UNITED STATES PATENTS

| | | | |
|---|---|---|---|
| 3,723,250 | 3/1973 | Aunstrup | 195—62 |
| 3,455,696 | 7/1969 | Ukita et al. | 99—9 |
| 3,546,812 | 12/1970 | Kobayashi et al. | 99—9 X |
| 3,633,547 | 1/1972 | Stevens et al. | |

LIONEL M. SHAPIRO, Examiner

U.S. Cl. X.R.

195—28 R